United States Patent
Oshikiri et al.

(10) Patent No.: US 7,545,542 B2
(45) Date of Patent: Jun. 9, 2009

(54) IMAGE FORMING APPARATUS

(75) Inventors: Kohji Oshikiri, Miyagi (JP); Masaru Nakamura, Kanagawa (JP); Toshiaki Watanabe, Tokyo (JP); Haruo Shida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 701 days.

(21) Appl. No.: 10/937,284

(22) Filed: Sep. 10, 2004

(65) Prior Publication Data

US 2006/0077249 A1    Apr. 13, 2006

(51) Int. Cl.
*G03G 15/01* (2006.01)
*B41J 2/385* (2006.01)

(52) U.S. Cl. ..................... 358/448; 347/115
(58) Field of Classification Search ................. 347/115, 347/118, 119, 116; 370/54, 58.2, 56, 94.3, 370/392, 442, 537; 358/1.15, 1.16, 501, 358/404, 280, 448
See application file for complete search history.

(56) References Cited

U.S. PATENT DOCUMENTS

| | | | |
|---|---|---|---|
| 5,216,693 A | 6/1993 | Nakamura | |
| 5,303,258 A | 4/1994 | Nakamura | |
| 5,438,589 A | 8/1995 | Nakamura | |
| 5,541,914 A * | 7/1996 | Krishnamoorthy et al. | 370/427 |
| 5,544,160 A * | 8/1996 | Cloonan et al. | 370/395.1 |
| 5,587,813 A | 12/1996 | Yamazaki et al. | |
| 5,757,795 A * | 5/1998 | Schnell | 370/392 |
| 5,923,701 A | 7/1999 | Nakamura | |
| 6,041,074 A | 3/2000 | Nakamura | |
| 6,055,266 A | 4/2000 | Nakamura | |
| 6,205,169 B1 | 3/2001 | Nakamura | |
| 6,470,021 B1 * | 10/2002 | Daines et al. | 370/442 |
| 6,573,918 B2 | 6/2003 | Kobayashi et al. | |
| 6,574,007 B1 * | 6/2003 | Imamura | 358/1.16 |
| 6,587,137 B2 | 7/2003 | Shinohara et al. | |
| 6,704,035 B2 | 3/2004 | Kobayashi et al. | |
| 7,196,713 B1 * | 3/2007 | Yamagishi | 347/116 |
| 2001/0028800 A1 * | 10/2001 | Kim | 399/12 |
| 2002/0012065 A1 | 1/2002 | Watanabe | |
| 2003/0223466 A1 * | 12/2003 | Noronha et al. | 370/537 |
| 2004/0027601 A1 * | 2/2004 | Ito et al. | 358/1.16 |
| 2004/0104993 A1 * | 6/2004 | Yokoyama | 347/241 |
| 2004/0141546 A1 | 7/2004 | Nakamura | |
| 2004/0190057 A1 * | 9/2004 | Takahashi et al. | 358/1.15 |

FOREIGN PATENT DOCUMENTS

| | | |
|---|---|---|
| JP | 2001-016382 | 1/2001 |
| JP | 2001-022542 | 1/2001 |

* cited by examiner

*Primary Examiner*—King Y Poon
*Assistant Examiner*—Allen H Nguyen
(74) *Attorney, Agent, or Firm*—Dickstein Shapiro LLP

(57) ABSTRACT

In an image forming apparatus in which an input module, an output module, a process module, and a memory have a plurality of ports and are connected by a packet switch having independent paths for data transmission, a path controlling part determines a process path based on data information from the input module and data transmission ability of paths within the image forming apparatus, and conducts a selection control to select a data transmission path in response to data transmission delay time for each process path and a data type of data to be transmitted.

8 Claims, 38 Drawing Sheets

IMAGE FORMING APPARATUS

BACKGROUND OF THE INVENTION

1. Field of the Invention

The present invention generally relates to an image forming apparatus applying an internal bus interface technology and a data transmission technology, apparatuses applying a control and communication method and functioning as a printer, a digital copier, or the like.

2. Description of the Related Art

Japanese Laid-open Patent Application No. 2001-16382 discloses that a high flexible system can be provided by using a high-speed serial interface as an internal interface of an image forming apparatus.

FIG. 1 is a block diagram showing a configuration of an image forming apparatus based on a conventional bus technology. An input scanner 11 functioning as an input module such as a scanner scanning an image, an output plotter 12 functioning as an output module for outputting an image, and a CPU 13 (process A) and an ASIC (Application Specific Integrated Circuit) 14 (process B) as process modules for conducting various image processes conducting an input to an output are connected to a main memory 15 via a common bus 16.

Since each of the process modules 13 and 14 conducts a data transmission via the common bus 16, while one process module uses the main memory 15, another process module cannot access the main memory 15 and is required to wait until the main memory 15 becomes available. A buffer memory may be prepared at a module side in order to process until the common bus 16 becomes available. However, accompanying with higher speed, a capacity required to the buffer memory increases. Also, since the common bus 16 covers all processes, data transmission process ability with a remarkable higher rate is required.

Accompanying with higher speed and higher quality of the image forming apparatus, in the data transmission technology inside the image forming apparatus, a high speed and a real-time process are required further more. Conventionally, a bus technology such as a PCI (Peripheral Component Interconnect) has been used for the internal data transmission. In this bus technology, a plurality of modules use the common bus by a time-sharing. In an image apparatus which requires to conduct various processes simultaneously by a pipeline method, a capacity required to the buffer memory is increased in response to an improvement of the speed. Thus, it becomes further difficult to maintain the real-time operation and conventional bus technologies are not suitable for these current requirements.

FIG. 2 is a schematic diagram illustrating a connection aspect between units in a conventional image forming apparatus. As shown in FIG. 2, units in a conventional copier and a conventional composite apparatus are directly connected to each other by a dedicated bus. The conventional copier having a single function as a copier conducts a filtering process with respect to image data read by a scanner unit 21 to convert a color by a scanner image process unit 22 and transfers the image data to a plotter image process unit 24 via a dedicated bus 20.

The plotter image process unit 24 sends data to a plotter unit 25 after conducting various filtering processes and corrections to bring out process characteristics of a plotter, and forms an image by the plotter unit 25.

FIG. 3 is a schematic diagram illustrating another connection aspect between units in the conventional image forming apparatus. Recently, the conventional image forming apparatus has been improved as a composite apparatus to include a copier. Accordingly, the number of units is increased and a configuration using a general purpose bus 20a has been used. For example, as shown in FIG. 3, a scanner unit 21a, a scanner image process unit 22a, a plotter control unit 23a, a plotter image process unit 24a, and a plotter unit 25a are connected to the general purpose bus 20a. By using the general purpose bus 20a, a scalability of functions of the image forming apparatus is increased.

As technologies related to the convention image forming apparatus above-described, the Japanese Laid-open Patent Application No. 2001-16382 discloses a digital copier and a digital copier system capable of configuring a higher flexible system by using a high speed serial interface as an internal interface. According to the Japanese Laid-open Patent Application No. 2001-16382, a LDU for controlling a write laser for writing an image onto a photoreceptor, a SCU for controlling a scanner, and a PCU for controlling an operation panel used by a user who inputs an operation instruction are directly connected to an MBD for controlling the entire digital copier by a serial cable via a high-speed serial interface.

However, the number of requests for a higher speed of the image forming apparatus has been increased, the data transmission cannot be conducted at a sufficiently high-speed by using the general bus. Moreover, it becomes further difficult to maintain the scalability of the image forming apparatus by electrical and physical constraints of hardware. Furthermore, in order to maintain transmission speed and scalability, it requires increasing a bus width. Disadvantageously, it becomes further difficult to design a substrate, an expense of the substrate is increased, and the number of pins for an ASIC (Application Specific Integrated Circuit) is increased.

Accordingly, various discussions have been made in order to solve the above-described problems. Currently, a high-speed transmission method by a point-to-point connection and a packet switch technology is considered. Thus, standards such as HyperTransport™, Rapid I/O™, fiber channel™, InfiniBand™, and the like are specified.

SUMMARY OF THE INVENTION

It is a general object of the present invention to provide image forming apparatuses in which the above-mentioned problems are eliminated.

A more specific object of the present invention is to provide an image forming apparatus which can exponentially improve an image process ability of the entire system in that a packet switch is used and separate paths for a data transmission among process modules so as to realize the data transmission being simultaneously conducted in parallel.

Another object of the present invention is to provide an image forming apparatus which can realize a higher productivity, increase a scalability, and realize a new function.

The above objects of the present invention are achieved by an image forming apparatus in which an input module, an output module, a process module, and a memory have a plurality of ports and are connected by a packet switch having independent paths for data transmission, said image forming apparatus comprising a path controlling part determining a process path based on data information from the input module and data transmission ability of paths within the image forming apparatus, and conducting a selection control to select a data transmission path in response to data transmission delay time for each process path and a data type of data to be transmitted.

In the image forming apparatus, information concerning the data transmission ability for each data type required between the input module and the output module at a minimum and information concerning the data transmission delay time for each path are stored in the memory.

In the image forming apparatus, a value measured when power is on is stored in the memory as the information concerning the data transmission delay time.

In the image forming apparatus, the information concerning the data transmission ability required between the input module and the output module at a minimum to store in the memory is updated each time a configuration of the image forming apparatus is changed.

In the image forming apparatus, the memory stores path information, the information concerning the data transmission ability, and the information concerning the delay time when a path change is conducted.

BRIEF DESCRIPTION OF THE DRAWINGS

In the following, embodiments of the present invention will be described with reference to the accompanying drawings.

DESCRIPTION OF THE PREFERRED EMBODIMENTS

In the following, embodiments of the present invention will be described with reference to the accompanying drawings.

First Embodiment

Figure 1:
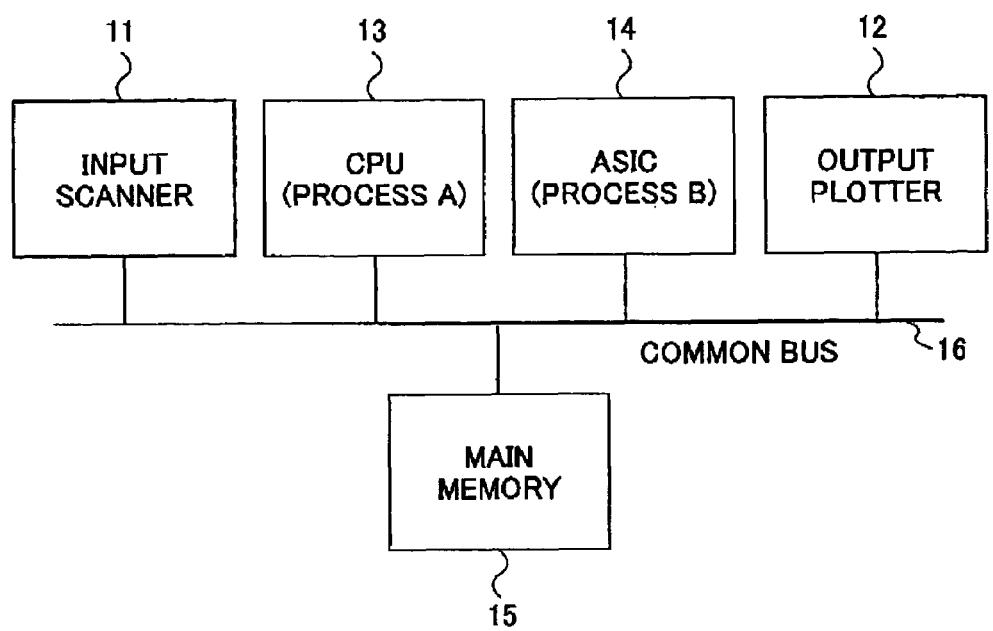
FIG. 1 is a block diagram showing a configuration of an image forming apparatus based on a conventional bus technology.
Figure 2:
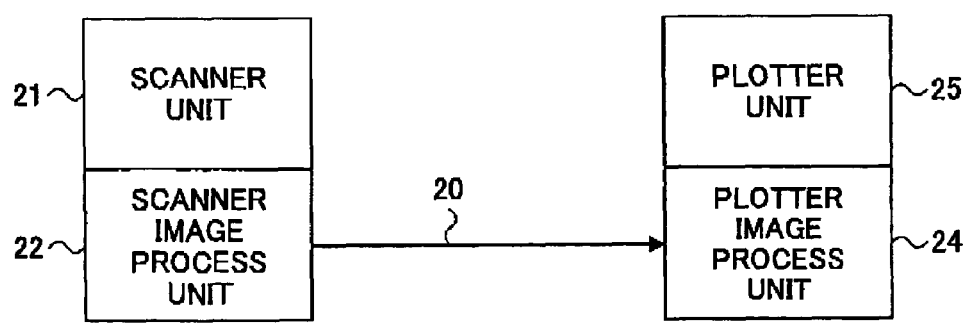
FIG. 2 is a schematic diagram illustrating a connection aspect between units in a conventional image forming apparatus.
Figure 3:
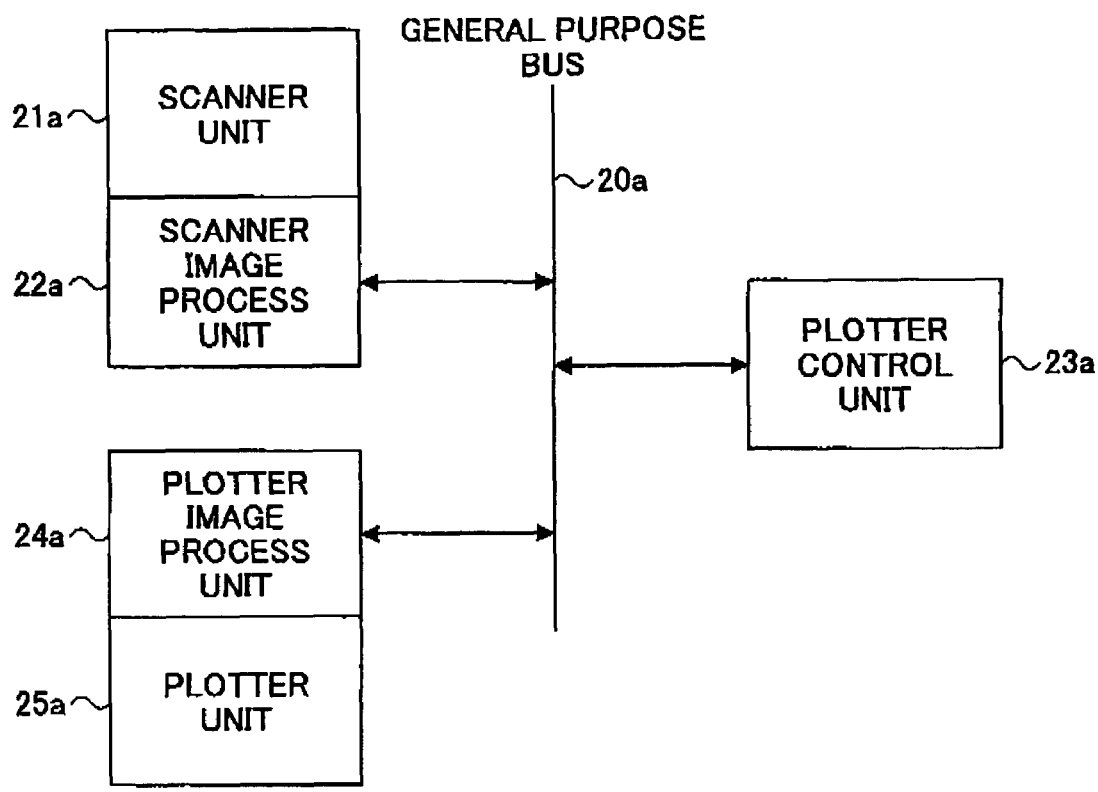
FIG. 3 is a schematic diagram illustrating another connection aspect between units in the conventional image forming apparatus.
Figure 4:
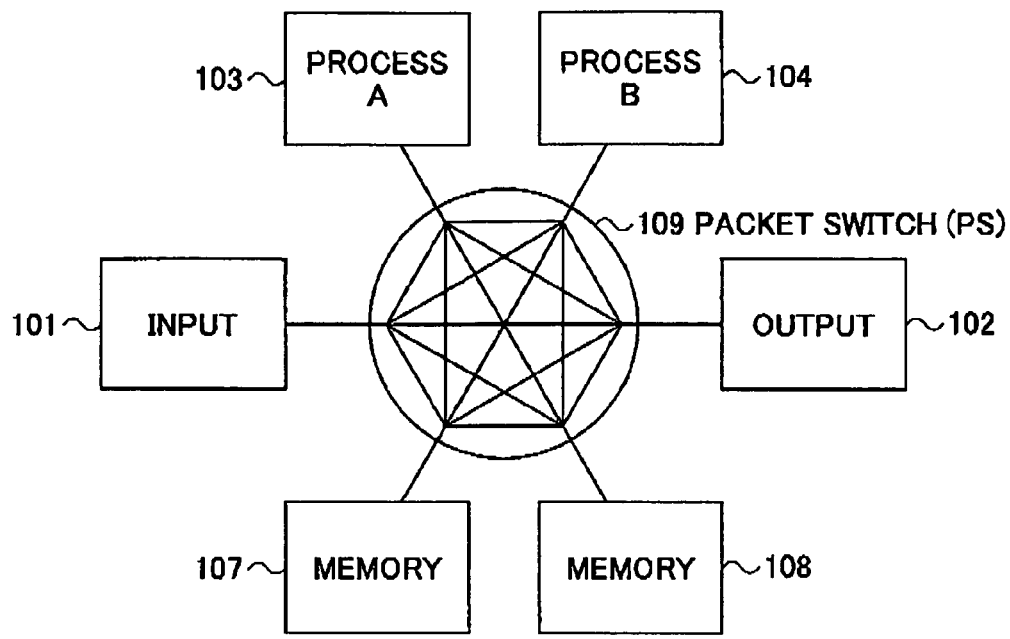
FIG. 4 is a block diagram showing an image forming apparatus according to a first embodiment of the present invention.

FIG. 4 is a block diagram showing an image forming apparatus according to a first embodiment of the present invention. As architecture of an image forming apparatus, a packet switch is used, instead of using a bus, and various process modules and memories are connected to ports of the packet switch.

In a packet switch (PS) 109 used in a configuration shown in FIG. 4, independent paths are provided for data transmission among ports. In this case, unused paths can be eliminated. By using the packet switch 109, it is possible to simultaneously conduct the data transmission through different independent paths.

For example, in FIG. 4, a two-way link is configured between the packet switch 109 and each of the process modules. It is possible to simultaneously conduct the data transmission from a memory 107 to a process module 103 while conducting the data transmission from an input module 101 to the memory 107, and further simultaneously conduct the data transmission toward an output module 102 through a memory 108 and a process module 104 by a pipeline method.

Since each of the independent paths conducts the data transmission independently, it is possible to eliminate a delay caused by a latency time for using a bus and a buffer memory necessary to store data during the latency time. Accordingly, it is possible to realize a real-time process and dramatically improve a process speed.

Moreover, since each of the independent paths can sufficiently realize the data transmission by a transmission ability lower than a common bus, it is possible to electrically realize the data transmission. Furthermore, it is possible to simplify various processes by changing a connection state of each of the independent paths in the packet switch 109 in accordance with process contents.

Figure 5:
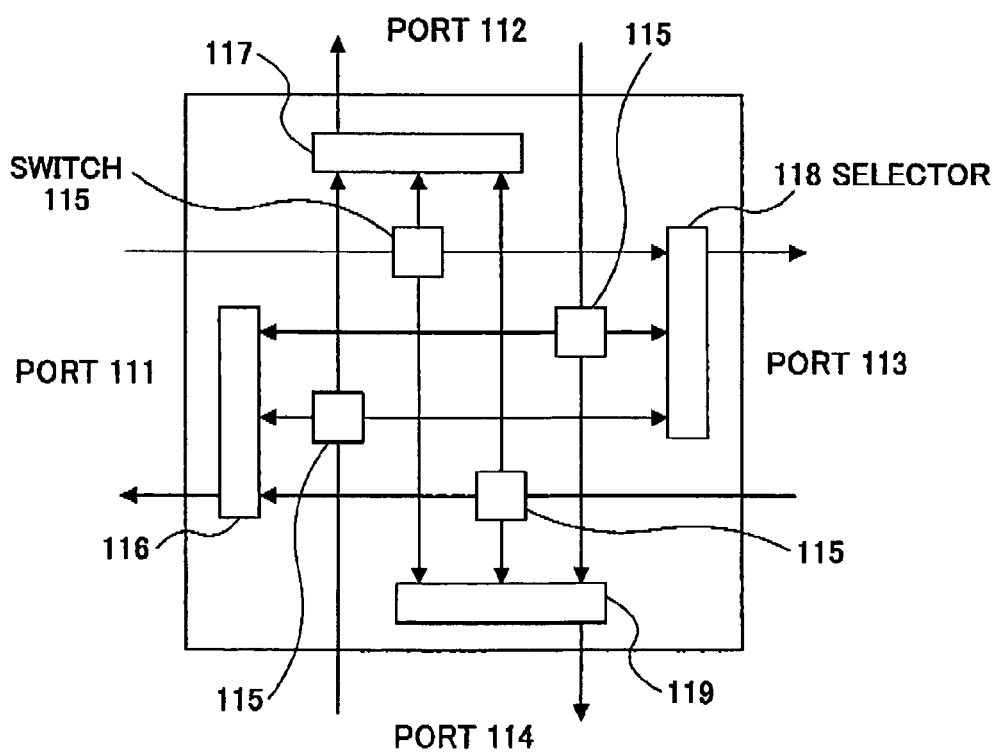
FIG. 5 is a circuit diagram showing an example of a configuration of the packet switch used in the image forming apparatus according to the first embodiment of the present invention.

FIG. 5 is a circuit diagram showing an example of a configuration of the packet switch used in the image forming apparatus according to the first embodiment of the present invention. In FIG. 5, the packet switch 109 including four ports will be described. Each of ports 111, 112, 113, and 114 includes an input port and output port. A packet input from the port 111 is sent to any one of the ports 112, 113, and 114 through a switch 115 based on information indicating a destination in the packet.

If the port 113 is selected, the packet is input to a selector 118 of the port 113. Any packet sent from the port 112 and 114 can be input to the selector 118. However, since a path to use is determined when the process contents are determined, the selector 118 may be set so that only a packet from the port 111 is output from the port 113. Selectors 116, 117, and 119 are arranged to respective ports 111, 112, and 114.

In this case, simultaneously, paths from the port 113 to the port 114, from the port 112 to the port 111, and from the port 114 to the port 112 can be determined. That is, four paths can be simultaneously determined at a maximum. Therefore, it is possible to dramatically improve the entire speed of the data transmission. In addition, instead of using any one of switches 115 to select an output port, a plurality of output ports may be simultaneously selected, so that the same data can be simultaneously sent to a plurality of modules.

Figure 6:
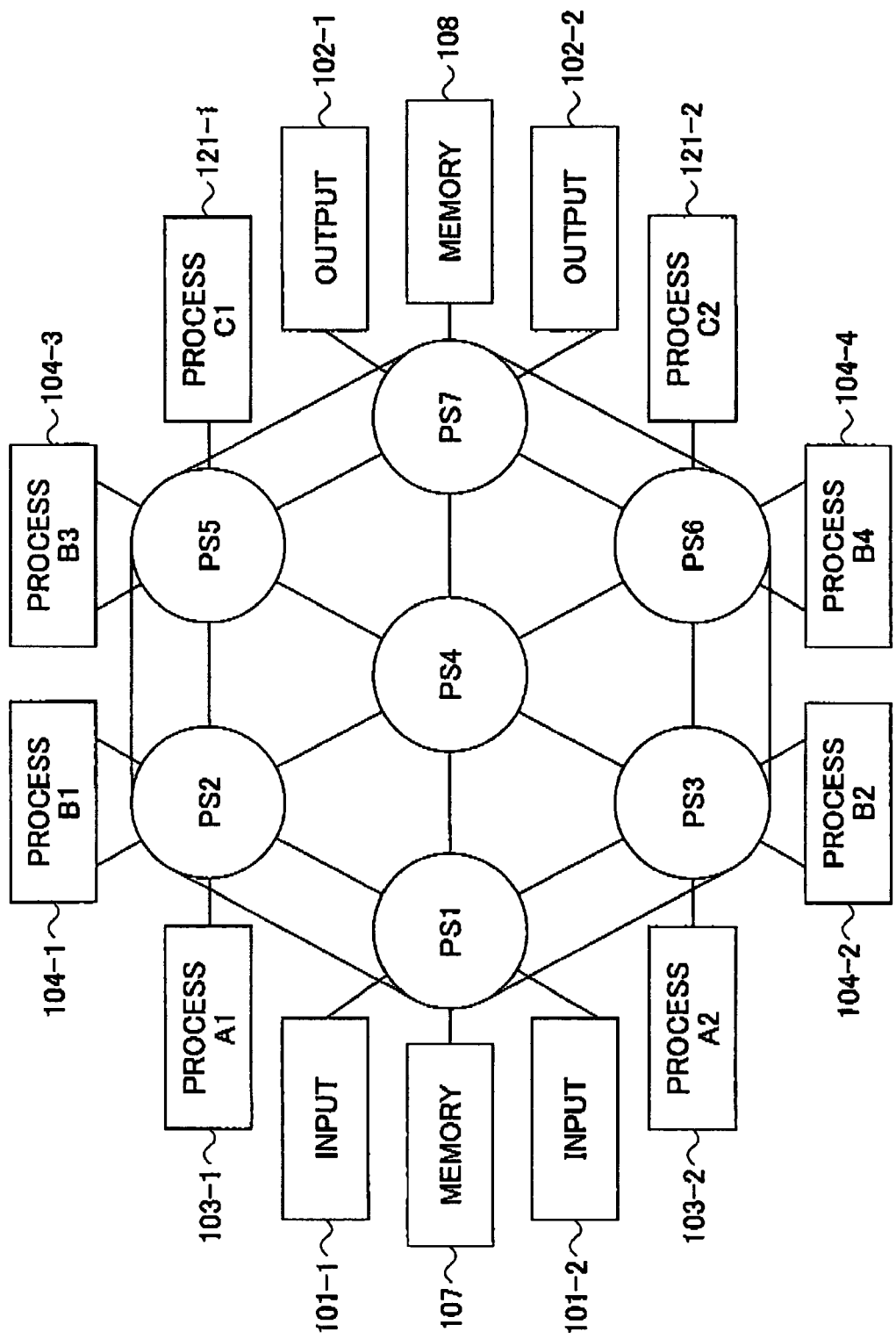
FIG. 6 is a block diagram showing a variation of the image forming apparatus according to the first embodiment of the present invention.

FIG. 6 is a block diagram showing a variation of the image forming apparatus according to the first embodiment of the present invention. In this variation, instead of the packet switch 109 alone shown in FIG. 4, a plurality of packet switches 109 are connected to each other by independent paths so as to enhance the packet switch 109 to configure a packet switch network 120. In this case, unnecessary independent paths may be eliminated from this configuration.

If a large-scale switch having dozens ports directly connect all process modules to each other is developed, since the number of internal paths becomes an extremely great number, it is not practical to develop such the large-scale switch. However, by using the packet switch network 120 being hierarchized for an internal data transmission, it is possible to configure the image forming apparatus to be relatively small and greatly flexible.

In FIG. 6, the packet switch network 120 includes packet switches PS 1, PS 2, PS 3, PS 4, PS 5, PS 6, and PS 7. An input 101-1, an input 101-2, and a memory 107 are connected to the packet switch PS 1. A process A1 module 103-1 and a process B3 module 104-3 are connected to the packet switch PS 2.

A process B2 module 104-2 is connected to the packet switch PS 3, and the process B3 module 104-3 and a process C1 module 121-1 are connected to the packet switch PS 5. A process B4 module 104-4 and a process C2 module 121-2 are connected to the packet switch PS 6. An output 102-1, an output 102-2, and a memory 108 are connected to the packet switch PS 7.

If process modules handling the same data are connected to a packet switch near the process modules, the data transmission is not frequently conducted toward a process module being located faraway. Accordingly, it is possible to reduce the number of paths in the packet switch network 120.

In FIG. 6, there are four process Bi modules 104-1, 104-2, 104-3, and 104-4 in the packet switch network 120 and two ports are connected to four process Bi modules 104-1, 104-2, 104-3, and 104-4. Regarding a process module consuming a process time, a plurality of the same process modules are arranged to share a load, and the number of ports is increased so as to improve transmission ability. Thus, it is possible to complete a process within the same time as other processes. Therefore, it is possible to improve the entire process ability.

Figure 7:
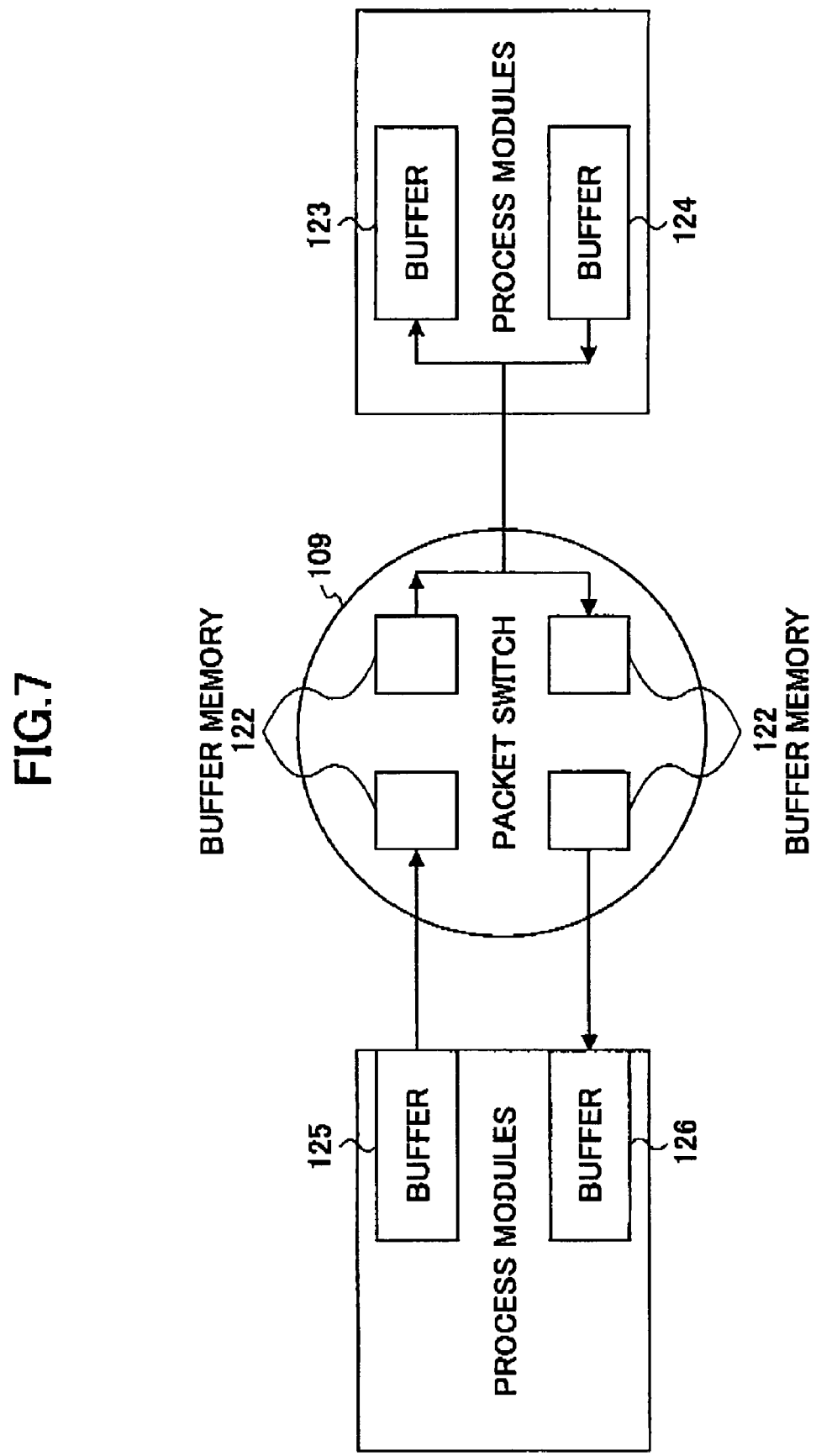
FIG. 7 is a schematic diagram showing a configuration in that buffer memories are additionally arranged to input and output ports of process modules and input and output ports of the packet switch according to the first embodiment of the present invention.

FIG. 7 is a schematic diagram showing a configuration in that buffer memories are additionally arranged to input and output ports of process modules and input and output ports of the packet switch according to the first embodiment of the present invention. In the configuration shown in FIG. 7, a buffer memory 122 having a relatively smaller capacity than image data is arranged for each of the input and output ports of the process modules and/or the packet switch 109.

In a case in that data are received and sent between process modules at real-time, even if input data to the packet switch 109 are directly output, the real-time operation is conducted. However, if there are differences of the process time between the process modules or if a process is required to conduct by a certain amount of a data unit, it is needed to arrange a memory between the process modules.

If the memory is arranged as a common main memory for all process modules to access, an interface speed of the memory becomes a bottleneck. An effect of installing the packet switch 109 is weakened. On the other hand, if a plurality of memories are arranged to share a load, an increase of the number of components and pins raises an expense.

Accordingly, as shown in FIG. 7, the buffers 123, 124, 125, and 126 and the buffer memory 122 are additionally arranged for the input and output ports of the process modules and the input and output ports of the packet switch 109, so that almost all process modules are not required to access a main memory. Therefore, it is possible to directly conduct the data transmission between the process modules.

In addition, since a capacity of the buffer memory 122 is small, it is possible to include the buffer memory 122 within various process module LSIs, switch LSIs, and a LSI having those various process module LSIs and switch LSIs. Since an additional memory is not needed externally, it is possible to effectively conduct each process.

A method for duplicating each of paths among each of process modules, each of memories, and the packet switch, paths between the packet switch and each of ports, and paths between packet switches will be described. In a case in that the data transmission ability is not so necessary, similar to a right side of FIG. 7, a single path is shared with an outgoing path and an incoming path and the data transmission is conducted by a time-sharing, so that the number of paths and pins of a LSI can be reduced. On the other hand, in a case of requiring higher data transmission, similar to a left side of FIG. 7, separated paths are arranged for the outgoing path and the incoming path and the data transmission is conducted by full duplex.

Regarding each of paths in the image forming apparatus, the number of signal lines of paths is increased in response to the data transmission ability, the data transmission speed is increased, or/and the data transmission abilities are asymmetrically set for the outgoing path and the incoming path. In a case in that there is no data for the incoming path, the incoming path may be eliminated and only the outgoing path may be arranged. Thus, each data transmission ability of the paths can be flexibly adjusted and the image forming apparatus can be configured so as to have the suitable number of paths.

In the image forming apparatus according to the first embodiment of the present invention, generally, a basic physical medium for each path uses one conducting wire. However, in a case of transmitting data for a certain long distance at high speed, a distance for the data transmission can be extended by sending a differential signal by using two conducting wires or by sending an optical signal by using an optical fiber. In addition, amplitude is shortened so that electromagnetic noise can be reduced.

First, according to the first embodiment of the present invention, since the packet switch, in which independent paths are arranged for the data transmission among the ports, are used instead of an internal bus, the data transmission can be simultaneously conducted for different paths. Moreover, it is possible to eliminate a delay caused by a latency time for using a bus and a buffer memory necessary to store data during the latency time. Accordingly, it is possible to improve the real-time process and dramatically improve the process speed.

Furthermore, lower transmission ability of each path can sufficiently realize similar transmission ability of a common bus and can be easily realized electrically. The connection state of the paths within the packet switch is changed based on the process contents, so that various processes can be easily realized. Also, if a plurality of output ports within the packet switch can be simultaneously selected, the same data can be simultaneously sent to the plurality of process modules.

Second, according to the first embodiment of the present invention, instead of using the packet switch alone, the packet switch network is configured by a plurality of packet switches among which are connected by independent paths. Therefore, it is possible to configure the image forming apparatus to be smaller and significantly flexible. For example, by sharing a load with a plurality of the same process modules (function modules), it is possible to improve the entire process ability.

Third, according to the first embodiment of the present invention, a buffer memory having a smaller capacity than image data is provided within a LSI for each input port or each output port of the process modules and/or packet switches. Therefore, it is not necessary to use the main memory by the time-sharing and arrange many memories, so that it is possible to realize the image forming apparatus having higher process ability at a lower expense.

Fourth, according to the first embodiment of the present invention, as the method for duplication each path within the image forming apparatus, a method for conducting the data transmission by the time-sharing while the outgoing path and the incoming path are shared and a method for conducting the data transmission in that different paths for the outgoing path and the incoming path can form paths suitable for the expense and performance.

Fifth, according to the first embodiment of the present invention, regarding each path within the image forming apparatus, the number of signal lines for each path is increased in response to the data transmission ability being required, the data transmission speed is increased, and the data transmission abilities for the outgoing path and the incoming path are asymmetrically arranged. Therefore, it is possible to flexibly adjust the data transmission ability of each path and configure the image forming apparatus having the suitable number of signal lines.

Sixth, according to the first embodiment of the present invention, as a basic physical medium, instead of using a single conducting wire, two conducting wires or optical fibers are used, so that the data transmission can be conducted for a certain long distance at high speed.

Second Embodiment

Figure 8:
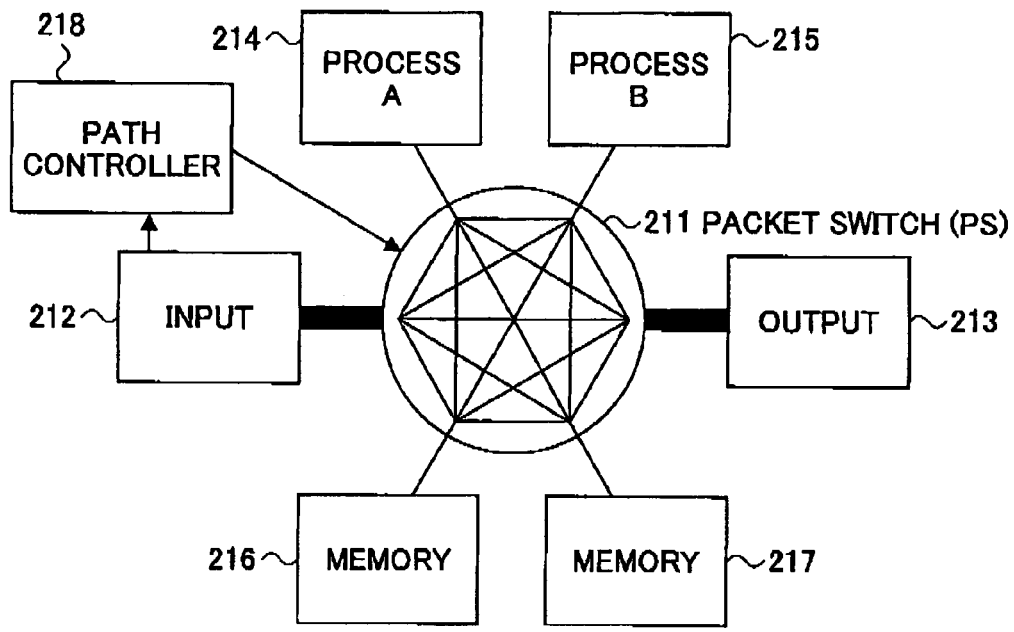
FIG. 8 is a schematic diagram showing an image forming apparatus according to a second embodiment of the present invention.

FIG. 8 is a schematic diagram showing an image forming apparatus according to a second embodiment of the present invention. In the second embodiment, as architecture of an image forming apparatus, a packet switch (PS) 211 shown in FIG. 8 is used, instead of using a bus, and an input module 212, an output module 213, process modules 214 and 215, and memories 216 and 217 are connected to respective ports of the packet switch 211 so as to configure the image forming apparatus.

Independent paths are arranged for the packet switch 211 to conduct a data transmission between any ports. However, unused paths can be eliminated. In this case, it is possible to simultaneously conduct the data transmission through different paths.

For example, in FIG. 8, a two-way link is configured between the packet switch 211 and each process module. Thus, the data transmission is conducted from the input module 212 to the memory 216 simultaneously while conducting the data transmission from the memory 216 to the process A module 214, and further the data transmission can be simultaneously conducted by a pipeline method until the output module 213 through the memory 217 and the process module 215.

Since each path conducts the data transmission independently, delay caused by a latency time for using a bus and a buffer memory necessary to store data during the latency time are eliminated. Accordingly, it is possible to improve the real-time process and dramatically improve the process speed. In addition, lower transmission ability of each path can sufficiently realize similar transmission ability of a common bus and can be easily realized electrically. The connection state of the paths within the packet switch 211 is changed based on the process contents, so that various processes can be easily realized.

In this case, it is important how to select a connection path. In FIG. 8, a path controller 218 comprehends information concerning process data input from the input module 212, for example, a process method (color or black and white, text process or image process, compressed data or raw data, and a like) and a data amount, and also searches for a suitable path in response to each process ability of the process modules 214 and 215 and each data transmission ability of the process modules 214 and 215, and controls to assign a path.

In FIG. 8, only a connection from the path to the path controller 218 is shown. The path controller 218 comprehends a process state and a used capacity based on information sent from the process modules 214 and 215 and the memories 216 and 217. The path controller 218 selects the suitable connection path, so that a process can be conducted at high speed without a waiting time.

Figure 9:
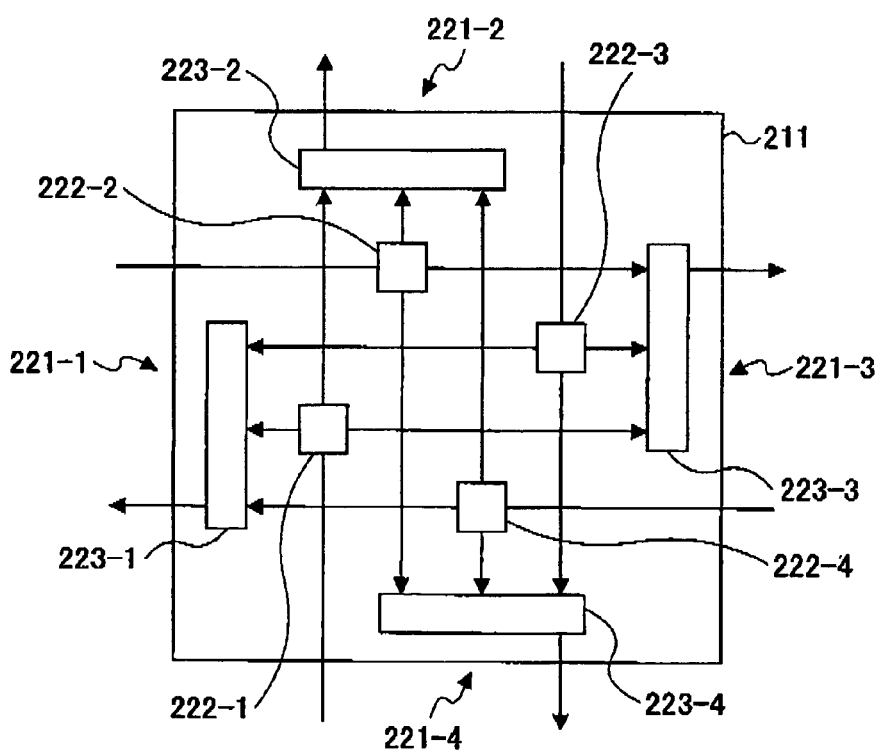
FIG. 9 is a configuration diagram of the packet switch according to the second embodiment of the present invention.

FIG. 9 is a configuration diagram of the packet switch according to the second embodiment of the present invention. An example of a configuration of the packet switch 211 used in the image forming apparatus according to the present invention will be described with reference to a switch having four ports shown in FIG. 9. In FIG. 9, each of ports 221-1 through 221-4 includes an input port and an output port A packet input from the port 221-1 is sent to any one of the port 221-2, 221-3, and 221-4 through a switch 222-2 which are controlled by the path controller 218 based on information showing a destination included in the packet.

When the port 221-3 is selected, the packet is input to a selector 223-3 of the port 221-3. Packets from the ports 221-2 and 221-4 can be input to the selector 223-3. Since each used path is uniquely determined if process contents are determined, the selector 223-3 of the port 221-3 is set so as to output the packet being sent only from the port 221-1, to the port 221-3.

In this case, similarly, a path from the port 221-3 to the port 221-4, a path from the port 221-2 to the port 221-1, and a path from the port 221-4 to the port 221-2 are set simultaneously. Since four paths can be set at a maximum, it is possible to improve the entire data transmission speed. Moreover, instead of using any one of switches 222-1, 222-2, 222-3, and 222-4 to select one of ports 221-1, 221-2, 221-3, and 221-4 as an output port, it is configured to simultaneously select a plurality of output ports, so as to simultaneously send the same data to a plurality of process modules.

Figure 10:
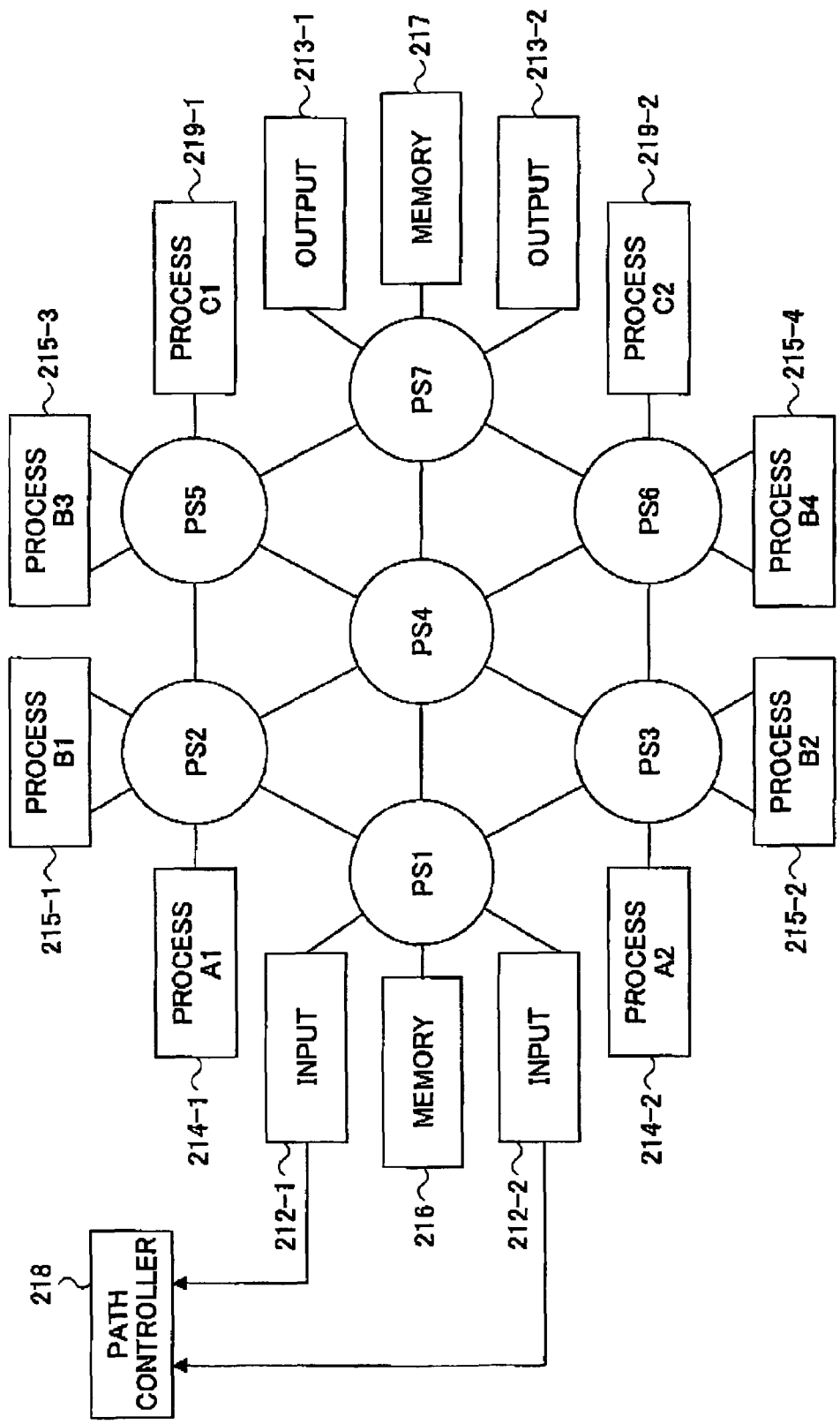
FIG. 10 is a schematic diagram showing a variation of the image forming apparatus according to the second embodiment of the present invention.

FIG. 10 is a schematic diagram showing a variation of the image forming apparatus according to the second embodiment of the present invention. In FIG. 10, instead of using a single packet switch 211, a plurality of packet switches PS 1, PS 2, PS 3, PS 4, PS 5, PS 6, and PS 7 are arranged and independent paths connect between any packet switches PS 1, PS 2, PS 4, PS 5, PS 6, and PS 7, so as to configure a packet switch network. In this case, an unnecessary path can be eliminated.

If a large-scale switch having dozens ports directly connect all process modules to each other is developed, since the number of internal paths becomes an extremely great number, it is not practical to develop such the large-scale switch. However, by using the packet switch network being hierarchized for an internal data transmission, it is possible to configure the image forming apparatus to be relatively small and greatly flexible.

If process modules handling the same data are connected to a packet switch near the process modules, the data transmission is not frequently conducted toward a process module being located faraway. Accordingly, it is possible to reduce the number of paths in the packet switch network.

In FIG. 10, there are four process Bi modules 215-1, 215-2, 215-3, and 215-4 in the packet switch network and two ports are connected to four process Bi modules 215-1, 215-2, 215-3, and 215-4. Regarding a process module consuming a process time, a plurality of the same process modules are arranged to share a load, and the number of ports is increased so as to improve transmission ability. Thus, it is possible to complete a process within the same time as other processes. Therefore, it is possible to improve the entire process ability. In this case, similarly, the path controller 218 selects a suitable connection path based on information concerning process data input from the input module 212. Therefore, it is possible to conduct a process at high speed without the waiting time.

In FIG. 10, two input modules 212-1 and 212-2 are shown for a case in that the image forming apparatus currently includes a plurality of input modules for a copier, a print, a FAX, and the like. In a case of including the plurality of input modules 212-2 and 212-2, the path controller 218 obtains information concerning the process data from each of the input modules 212-2 and 212-2, and determines effective paths for the entire image forming apparatus.

The priority may be determined based on a type of data being input. When the path controller determines that a process for the data takes a longer time, the paths are determined so that the process is conducted first (for example, color process and black and white process). Alternatively, when data is received to print out immediately while processing other data, the paths are determined so that this immediate print is prioritized and other data being processed are stored in the memories 216 and 217. By sending an instruction priority command from a user, it is possible to determine whether or not a print indicates a higher priority (immediate print).

The priority is dynamically changed. For example, in a case in that a print for a plurality of pages includes only one color image page, the number of paths for a color process is increased during the print so as to conduct in parallel. Also, in a case in that a copy or a print having the higher priority is instructed while receiving a FAX, a process is assigned to the copy or the print having the higher priority while receiving the FAX. In this case, data concerning a process for the FAX are stored in the memories 216 and 217, and the received FAX is output when the copy or the print ends.

Figure 11:
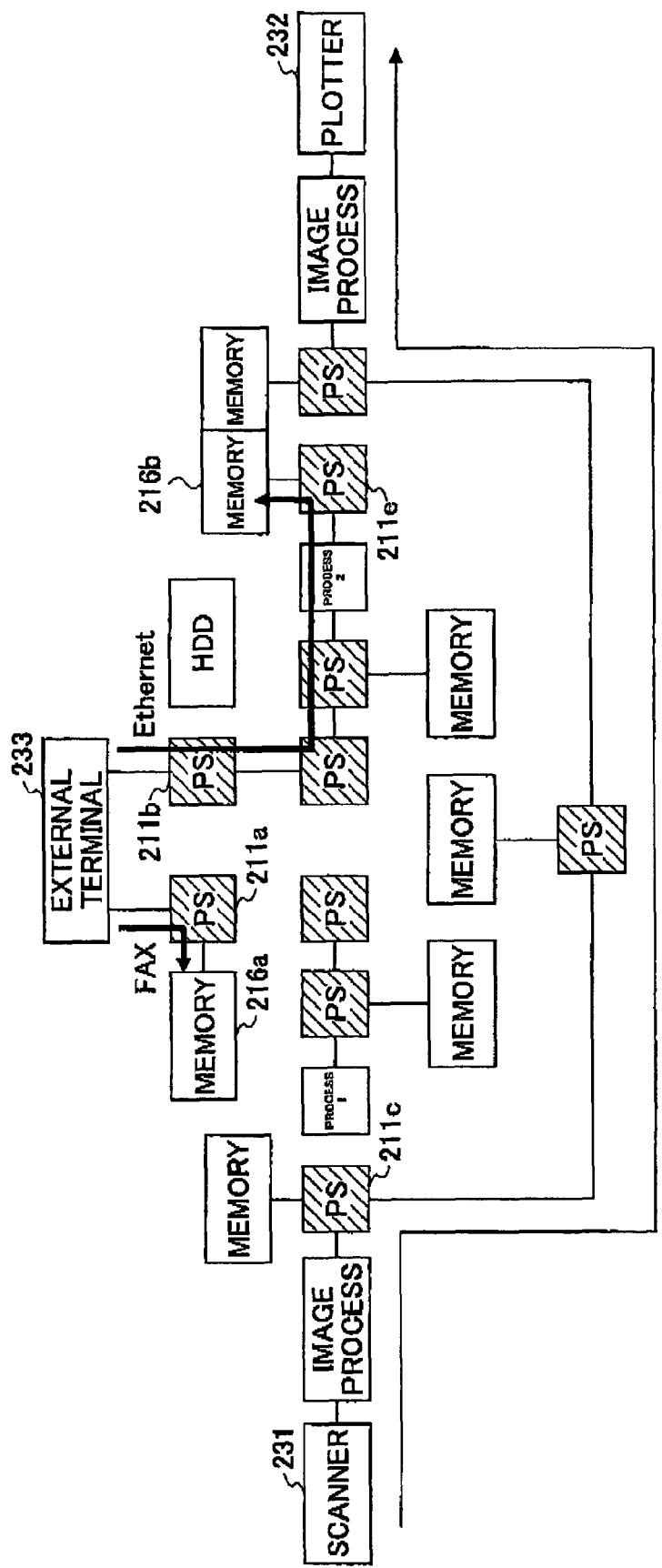
FIG. 11 is a diagram for explaining a first example of a path change of the data transmission in the image forming apparatus according to the second embodiment of the present invention.
Figure 12:
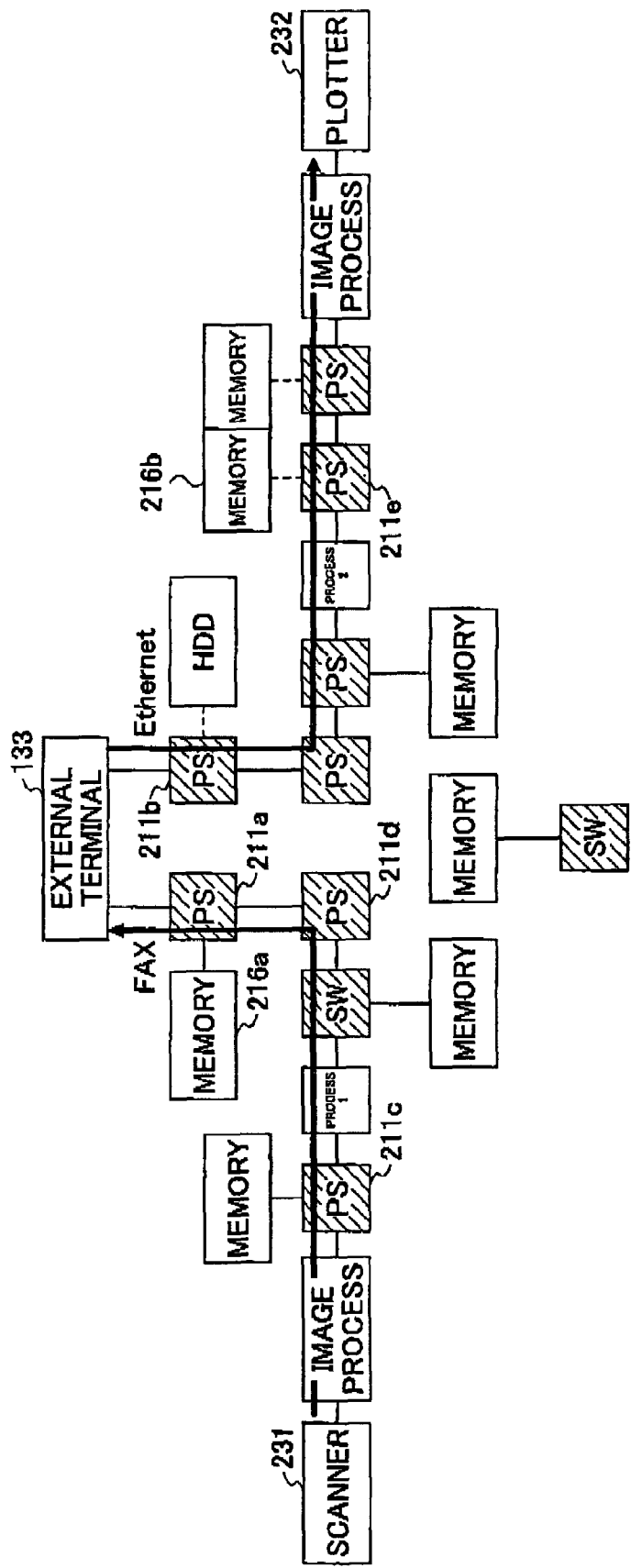
FIG. 12 is a diagram for explaining a second example of the path change of the data transmission in the image forming apparatus according to the second embodiment of the present invention.
Figure 13:
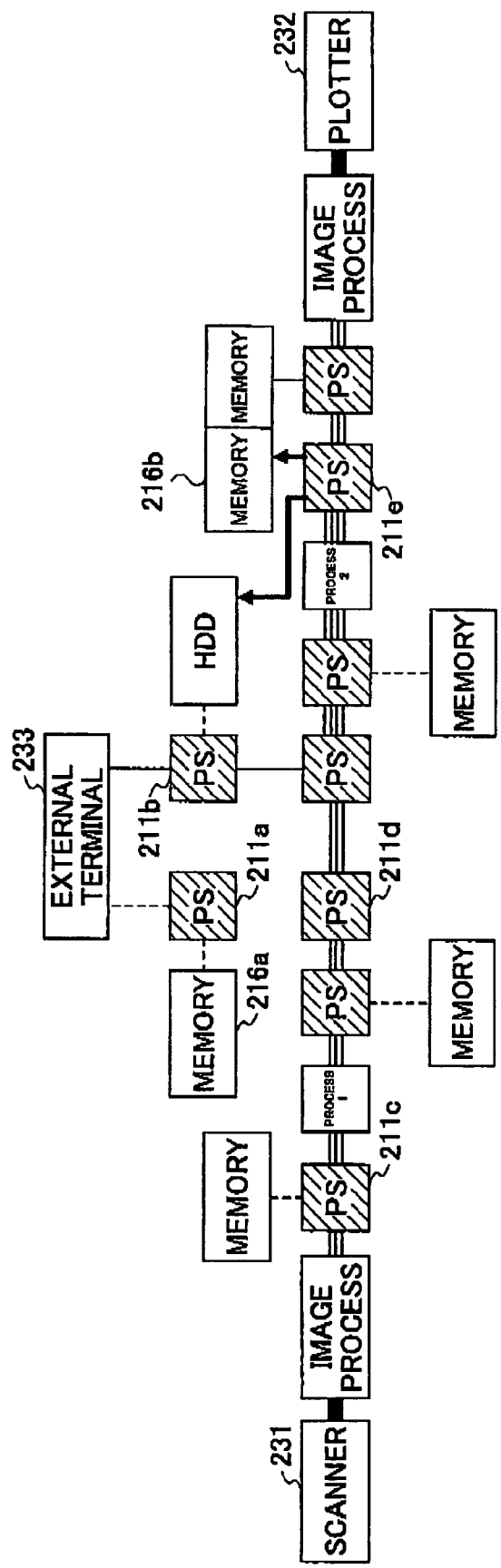
FIG. 13 is a diagram for explaining a third example of the path change of the data transmission in the image forming apparatus according to the second embodiment of the present invention.

FIG. 11 is a diagram for explaining a first example of a path change of the data transmission in the image forming apparatus according to the second embodiment of the present invention, FIG. 12 is a diagram for explaining a second example of the path change of the data transmission in the image forming apparatus according to the second embodiment of the present invention, and FIG. 13 is a diagram for explaining a third example of the path change of the data transmission in the image forming apparatus according to the second embodiment of the present invention. The image forming apparatus shown in FIG. 11 through FIG. 13, is a composite image forming apparatus, which includes a scanner 231 (input module 212), a plotter 233 (output module 213), and an external terminal 233 (including the Ethernet™ and a FAX terminal) and can be used as a copier by combining the scanner 231 and the plotter 232, a FAX sender by combining the scanner 231 and the FAX terminal, a printer by combining the Ethernet™ and the plotter 232, and a FAX receiver by combining the FAX terminal and the plotter 232.

In FIG. 11, a case, in which data are sent from the Ethernet™ and the FAX terminal while sending image data from the scanner 231 to the plotter 232 and printing out the image data, is illustrated.

Since the copy has the higher priority and the image data are continued to be sent from the scanner 231 to the plotter 232, PSs 211a, 211b, 211c, and 211e are switched so that the data are sent from the FAX terminal to a memory 216a and data being sent through the Ethernet™ to print out is processed at a process 2 (for example, decompression of compressed data) and then stored in a memory 216b.

In FIG. 12, a case, in which data received by fax is output to the plotter 32 while sending data from the scanner 213 to outside through the Ethernet™, is illustrated. PSs 211a, 211b, 211c, 211d, and 211e are switched to realize this case.

FIG. 13, image processes, a processes 1 and 2, and PS 211 have a plurality of ports and a parallel process is conducted. While the image data are processed by the processes 1 and 2 and sent to the plotter 32, print data are received through the Ethernet™.

In this case, when the image forming apparatus can afford to process data from the scanner 31, paths are selected to form a single line so that a print process is conducted until the process 2 and the data from the scanner 31 is stored in the memory 216b or an HDD (Hard Disk Device) 216h. When a process concerning the print data ends, the paths used for the print process are returned to use for a connection from the scanner 31 to the plotter 21. When a process concerning the scanner 31 ends, paths are selected so that the print data are output.

According to the second embodiment of the present invention, first, suitable paths are selected based on information concerning input data, so that it is possible to conduct the image process at high speed.

Second, in a case in that the parallel process can be conducted, a process path to conduct the parallel process is formed, so that it is possible to conduct the image process at high speed.

Third, in a case in a plurality of inputs are made, suitable paths are selected, so that a certain amount of the image process can be conducted while other processes are conducted.

Fourth, by determining a priority order, it is possible to conduct the image process in accordance with the priority order.

Fifth, by dynamically switching paths, it is possible to conduct the image process at high speed.

Third Embodiment

Figure 14:
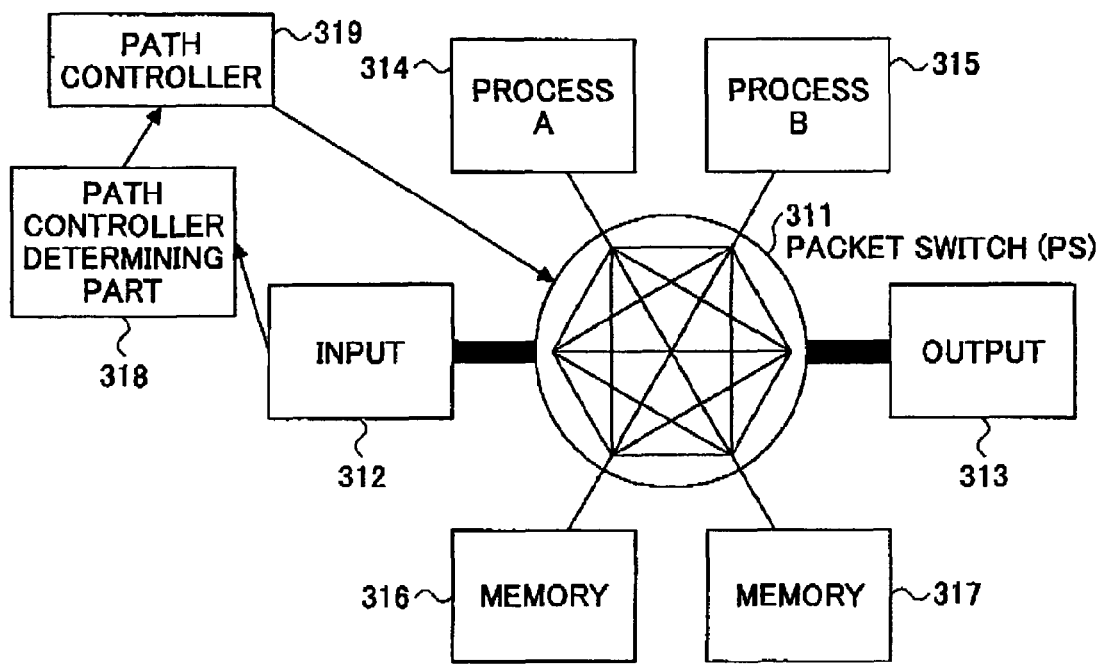
FIG. 14 is a diagram showing a configuration of an image forming apparatus according to a third embodiment of the present invention.

FIG. 14 is a diagram showing a configuration of an image forming apparatus according to a third embodiment of the present invention. In the third embodiment, as architecture of an image forming apparatus, a packet switch (PS) 311 shown in FIG. 14 is used, instead of using a bus, and an input module 312, an output module 313, process modules 314 and 315, and memories 316 and 317 are connected so as to configure the image forming apparatus.

In a packet switch (PS) 311 used in a configuration shown in FIG. 14, independent paths are provided for data transmission among ports. In this case, unused paths can be eliminated. Thus, it is possible to simultaneously conduct the data transmission through different independent paths.

For example, in FIG. 14, a two-way link is configured between the packet switch 311 and each of the process modules. Thus, the data transmission is conducted from the input module 312 to the memory 316 simultaneously while conducting the data transmission from the memory 316 to the process A module 314, and further the data transmission can be simultaneously conducted by a pipeline method until the output module 313 through the memory 317 and the process module 315.

Since each path conducts the data transmission independently, delay caused by a latency time for using a bus and a buffer memory necessary to store data during the latency time are eliminated. Accordingly, it is possible to improve the real-time process and dramatically improve the process speed. In addition, lower transmission ability of each path can sufficiently realize similar transmission ability of a common bus and can be easily realized electrically. The connection state of the paths within the packet switch 311 is changed based on the process contents, so that various processes can be easily realized. A path control determining part 318 and a path controller 319 control the connection state of the path within each switch.

Figure 15:
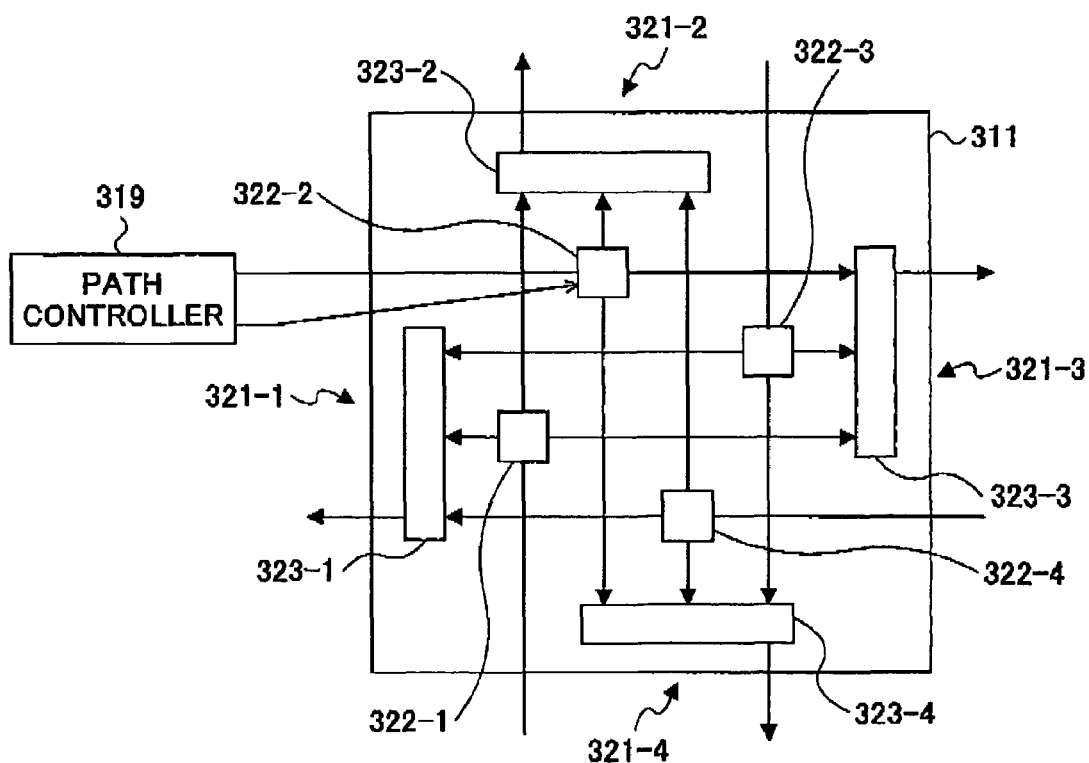
FIG. 15 is a configuration diagram of the packet switch according to the third embodiment of the present invention.

FIG. 15 is a configuration diagram of the packet switch according to the third embodiment of the present invention. An example of a configuration of the packet switch 311 used in the image forming apparatus according to the present invention will be described with reference to a switch having four ports shown in FIG. 15. In FIG. 15, each of ports 321-1 through 321-4 includes an input port and an output port. A packet input from the port 321-1 is sent to any one of the ports 321-2, 321-3, and 321-4 through a switch 322-2 which are controlled by the path controller 319 based on information showing a destination included in the packet. When the port 321-3 is selected, the packet is input to a selector 323-3 of the port 321-3.

Packets from the ports 321-2 and 321-4 can be input to the selector 323-3. Since each used path is uniquely determined if process contents are determined, the selector 323-3 of the port 321-3 is set so as to output the packet being sent only from the port 321-1, to the port 321-3. In this case, similarly, a path from the port 321-3 to the port 321-4, a path from the port 321-2 to the port 321-1, and a path from the port 321-4 to the port 321-2 are set simultaneously. Since four paths can be set at a maximum, it is possible to improve the entire data transmission speed.

Moreover, instead of using any one of switches 322-1, 322-2, 322-3, and 322-4 to select one of ports 321-1, 321-2, 321-3, and 321-4 as an output port, it is configured to simultaneously select a plurality of output ports, so as to simultaneously send the same data to a plurality of process modules. The path controller 319 controls the switches 322-1, 322-2, 322-3, and 322-4.

Figure 16:
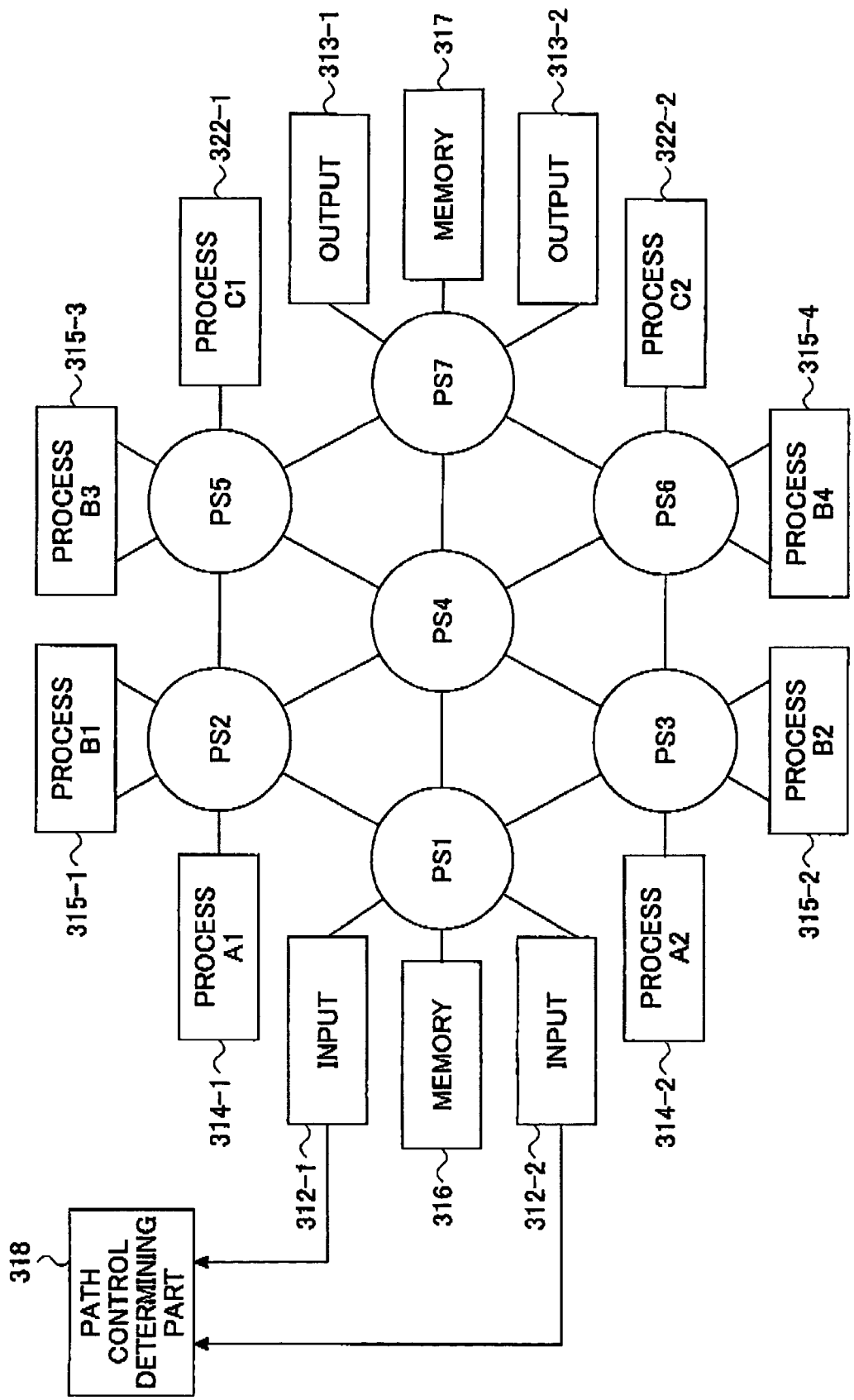
FIG. 16 is a schematic diagram showing a variation of the image forming apparatus according to the third embodiment of the present invention.

FIG. 16 is a schematic diagram showing a variation of the image forming apparatus according to the third embodiment of the present invention. In FIG. 16, instead of using a single packet switch 311, a plurality of packet switches PS 1, PS 2, PS 3, PS 4, PS 5, PS 6, and PS 7 are arranged and independent paths connect between any packet switches PS 1, PS 2, PS 4, PS 5, PS 6, and PS 7, so as to configure a packet switch network. In this case, an unnecessary path can be eliminated. Numerals 322-$i$ denote process Ci modules.

If a large-scale switch having dozens ports directly connect all process modules to each other is developed, since the number of internal paths becomes an extremely great number, it is not practical to develop such the large-scale switch. However, by using the packet switch network being hierarchized for an internal data transmission as shown in FIG. 16, it is possible to configure the image forming apparatus to be relatively small and greatly flexible.

If process modules handling the same data are connected to a packet switch near the process modules, the data transmission is not frequently conducted toward a process module being located faraway. Accordingly, it is possible to reduce the number of paths in the packet switch network.

In FIG. 16, there are four process Bi modules 315-1, 315-2, 315-3, and 315-4 in the packet switch network and two ports are connected to four process Bi modules 315-1, 315-2, 315-3, and 315-4. Regarding a process module consuming a process time, a plurality of the same process modules are arranged to share a load, and the number of ports is increased so as to improve transmission ability. Thus, it is possible to complete a process within the same time as other processes. Therefore, it is possible to improve the entire process ability.

In this case, it is important how to select a connection path. Generally, the path controller 319 selects a suitable connection path based on information concerning process data input from the input module 312 and the data transmission ability required to each path within the image forming apparatus, the data transmission ability available in each path and process ability of each process module within the image forming apparatus. As a result, the suitable paths are maintained by controlling the path controller 319. However, a delay time caused by the packet switches PS 1 through PS 7 which are used for the suitable paths is increased in response to the number of the packet switches PS 1 through PS 7 which are used for the suitable paths. Accordingly, in the third embodiment, the paths are selected considering the delay time in response to the number of the packet switches PS 1 through PS 7.

Figure 17A:
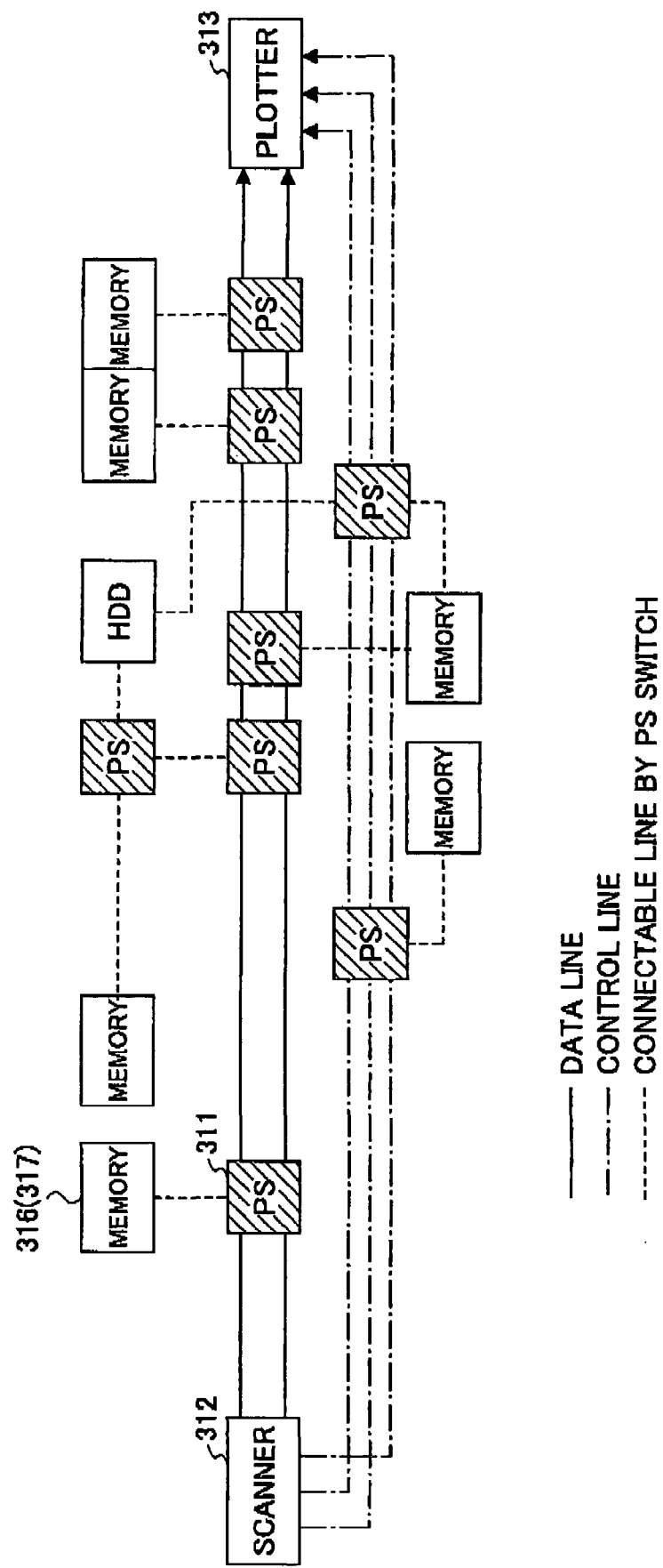
FIG. 17A, FIG. 17B, and FIG. 17C are diagrams showing detail examples of a packet switch configuration of the image forming apparatus according to the third embodiment of the present invention.
Figure 17B:
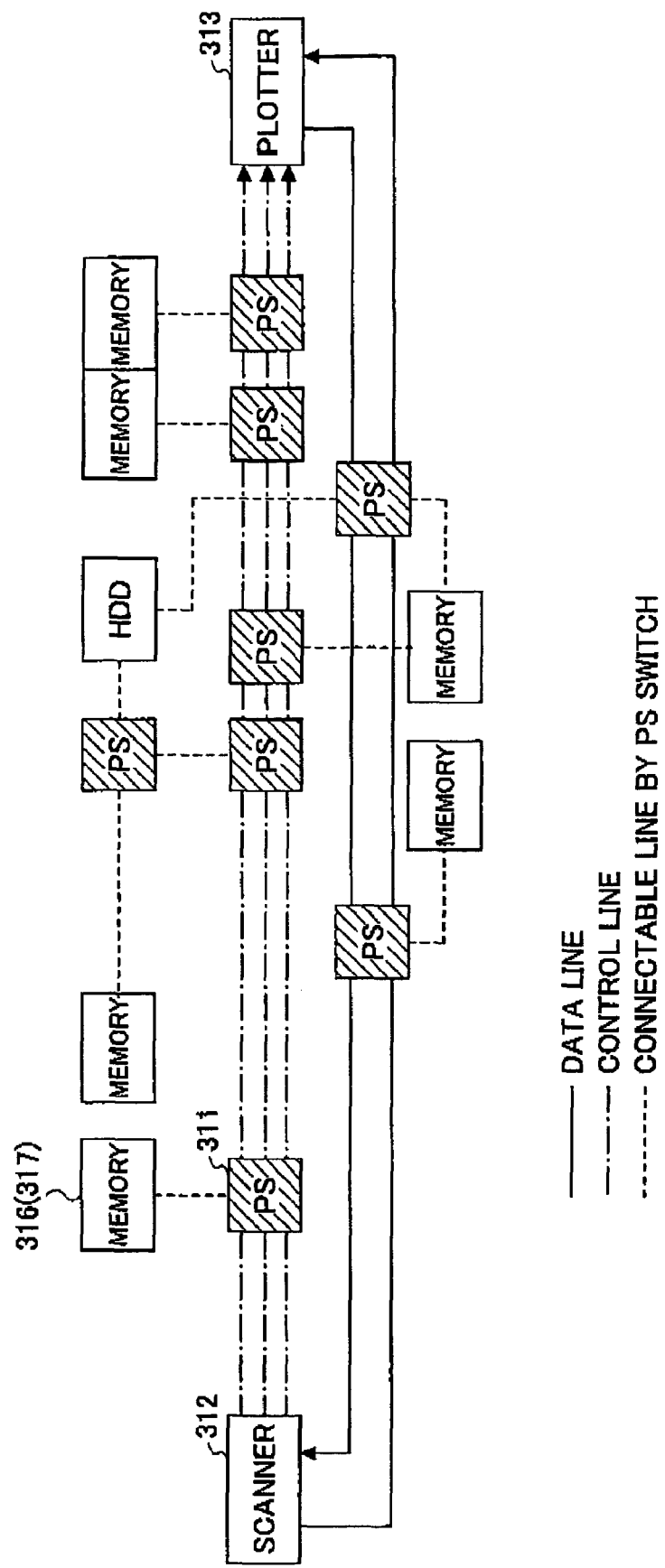
Figure 17C:
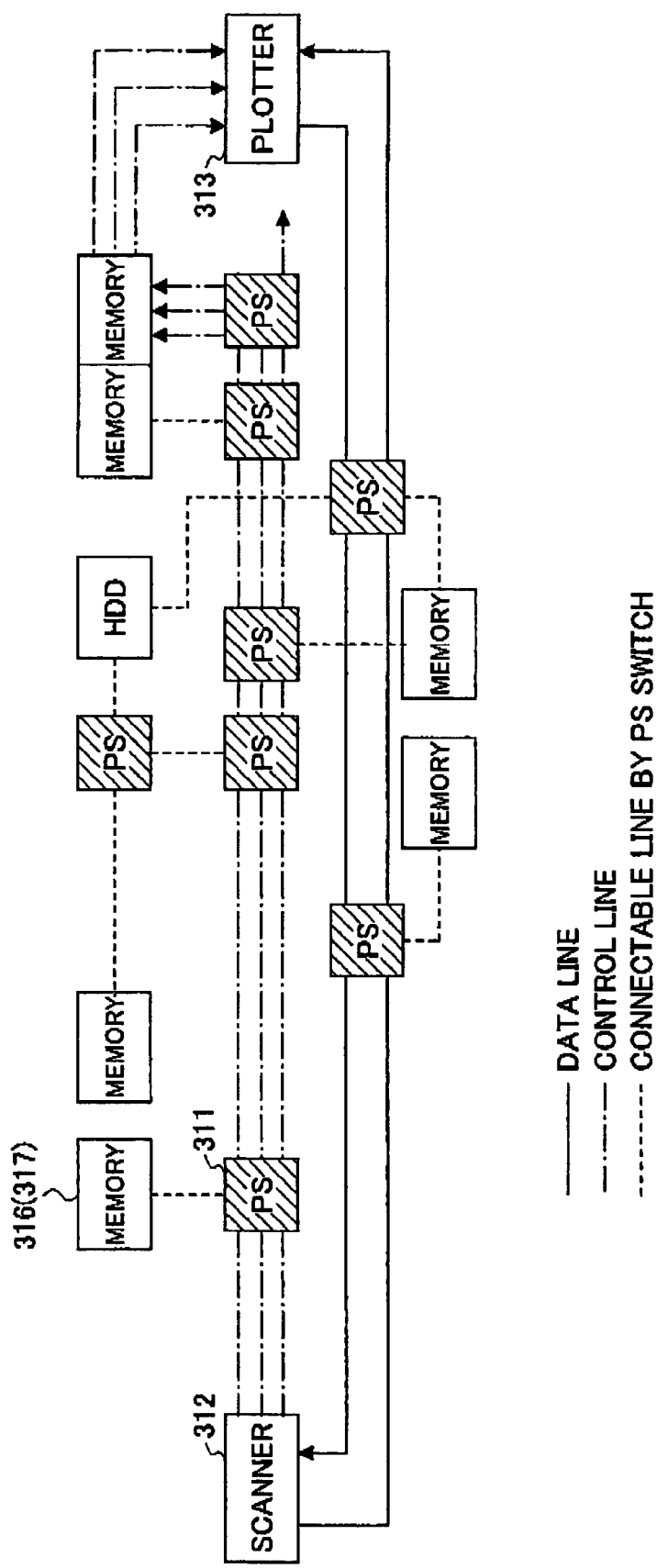

FIG. 17A, FIG. 17B, and FIG. 17C are block diagrams showing detailed examples of a packet switch configuration of the image forming apparatus according to the third embodiment of the present invention A case considering the delay time will be described. In FIG. 17A through FIG. 17C, a total of three lines are assigned. That is, one data line as a command line for an input command and one data line as a command line for an output command in order to transmit data between a scanner as the input module 312 and a laser printer as the output module 313, and one data line for image data transmission are assigned.

In FIG. 17A, a regular path assignment is illustrated for high-speed data transmission. Some types of the laser printer as the output module 313 communicate a timing of the data transmission by the command line. In this case, if a delay of the command line is greater, a start of the data transmission may be delayed.

When an allowable response delay of the command line is smaller, as shown in FIG. 17B, paths where a response speed is faster for the command line (the packet switches are not included as much as possible in the paths) are selected. When the transmission ability of the data line comes short, as shown in FIG. 17C, the paths are selected to send data to an output device through a memory buffer and the like so as to compromise the transmission ability.

The delay time and the allowable response speed in a case of including the packet switch for each path may be stored in a storage unit such as a memory beforehand. Then, a controller or a program searches for suitable paths.

Moreover, a timer circuit may be arranged, the delay time is measured when the image forming apparatus is turned on, and a measured value is stored in the storage unit. Accordingly, it is possible to update information every time the configuration of the image forming apparatus is changed and the paths are changed.

Furthermore, when an input unit or an output unit being connected to the image forming apparatus is changed and an image process configuration is changed, information obtained from a changed input unit or a changed output unit is stored in the storage unit. The information may be obtained from a storage area within the changed input unit or the changed output unit, or a program may set the information.

Moreover, when an initial connection path or a connection path following the initial connection path is changed, path information (how the path is connected), the data transmission ability of the path, the delay time, and the data transmission ability required to input and output are stored in a memory as information used to determine whether or not a path change is required and as information concerning a path selection.

According to the third embodiment of the present invention, the paths are selected by considering the delay time, so that it is possible to select a suitable process path for the image forming apparatus requiring a high speed response.

Moreover, by gathering information concerning the path selection, it is possible to select a suitable path considering passed information.

Fourth Embodiment

Figure 18:
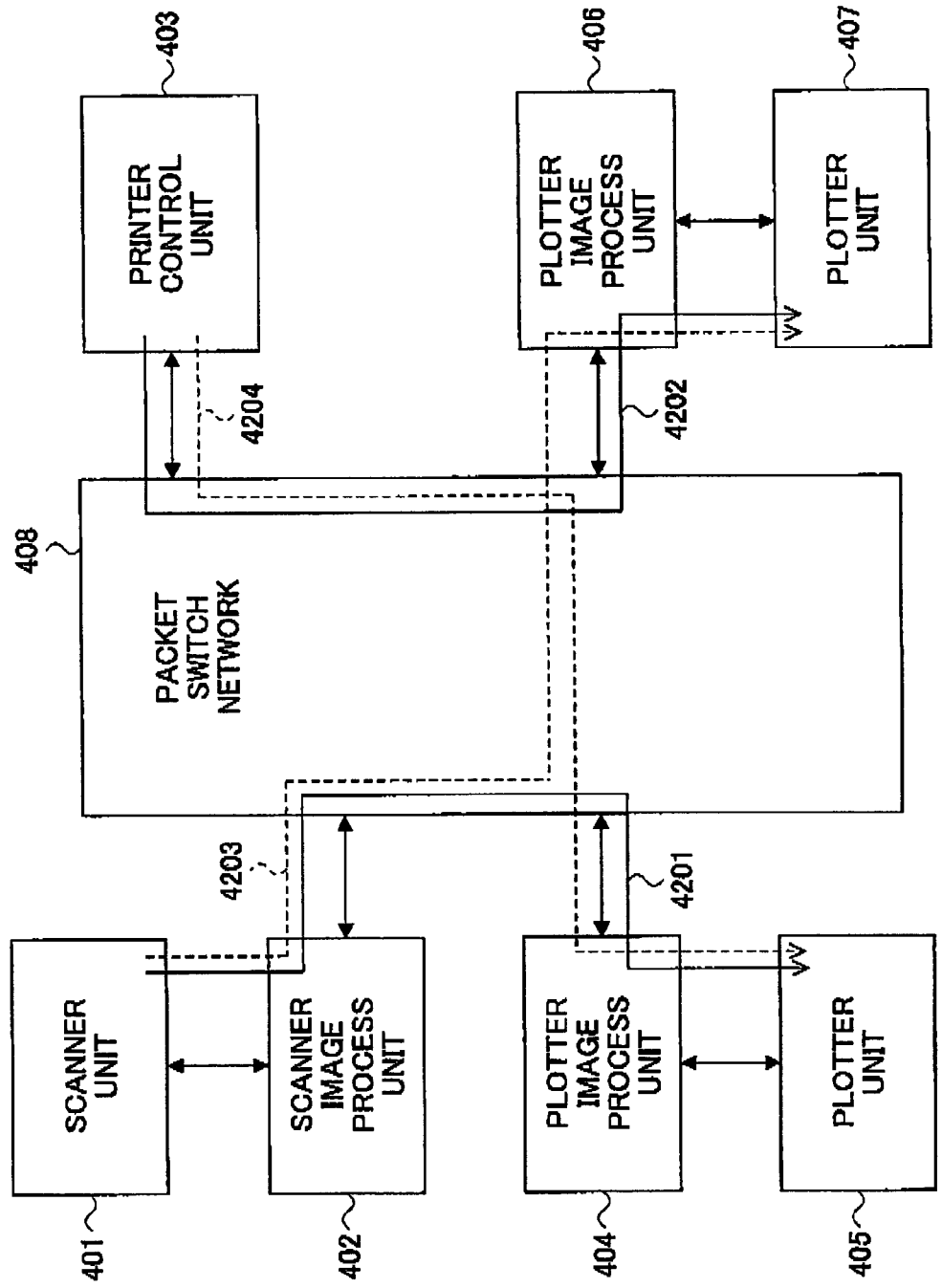
FIG. 18 is a block diagram showing an image forming apparatus according to a fourth embodiment of the present invention.

FIG. 18 is a block diagram showing an image forming apparatus according to a fourth embodiment of the present invention. In FIG. 18, for example, a scanner unit 401 is a unit to read image data by a CCD (Common Core of Data). A scanner image process unit 402 conducts a color conversion process and various filter processes.

A printer control unit 403 conducts a conversion from a description written in a printer language to image data and an image rotation. A plotter image process unit 404 conducts various filter processes and corrections to sufficiently use process characteristics of a plotter. For example, a plotter unit 405 conducts a latent image formation by a LD (Laser Diode) and adheres toners to form an image.

The scanner unit 401 is connected to a respective scanner image process unit 402 via a dedicated bus. The plotter image process unit 404 is connected to a respective plotter unit 405 via another dedicated bus. The scanner image process unit 402, the printer control unit 403, and the plotter image process unit 404 are connected to a packet switch network 408.

The packet switch network 40B includes a function for routing a packet so that packet data is transferred from the scanner image process unit 402, the printer control unit 403, and the plotter image process unit 404 to a destination unit.

Next, an operation in the image forming apparatus according to the fourth embodiment of the present invention will be described. For example, a case, in which an image forming process is conducted with respect to data read by the scanner unit 401 by the plotter unit 405 and the image forming process is conducted with respect to data from the printer control unit 403 by the plotter unit 407, will be described. As shown by a solid line 4201 in FIG. 18, data sent from the scanner unit 401 to the scanner image process unit 402 are processed by the scanner image process unit 403 and are formed to be a packet, and then, the packet is sent to the packet switch network 408.

The packet switch network 408 transmits the packet to the plotter image process unit 404 based on a routing table which is defined beforehand. The plotter image process unit 404, which receives the packet, processes the packet, and then, sends the packet to the plotter unit 405. Data sent to the plotter unit 405 are formed to be an image by the plotter unit 405.

Similarly, as shown by a solid line 4202 in FIG. 18, data processed by the printer control unit 403 are formed to be a packet, and are sent to the packet switch network 408. The packet switch network 408 transfers the packet to the plotter image process unit 406 based on the routing table, which is defined beforehand. The plotter image process unit 406 receives the packet and processes the packet. After that, the plotter image process unit 406 transfers data to the plotter unit 407. Data are formed to be an image by the plotter unit 407.

For example, similarly, in a case in that data read by the scanner unit 401 is formed to be an image by the plotter unit 407 and data from the printer control unit 403 are formed to be an image by the plotter unit 405, as shown by dashed lines 4203 and 4204 in FIG. 18, a packet is transferred and formed to be an image in accordance with the dashed lines 4203 and 4204.

Figure 19:
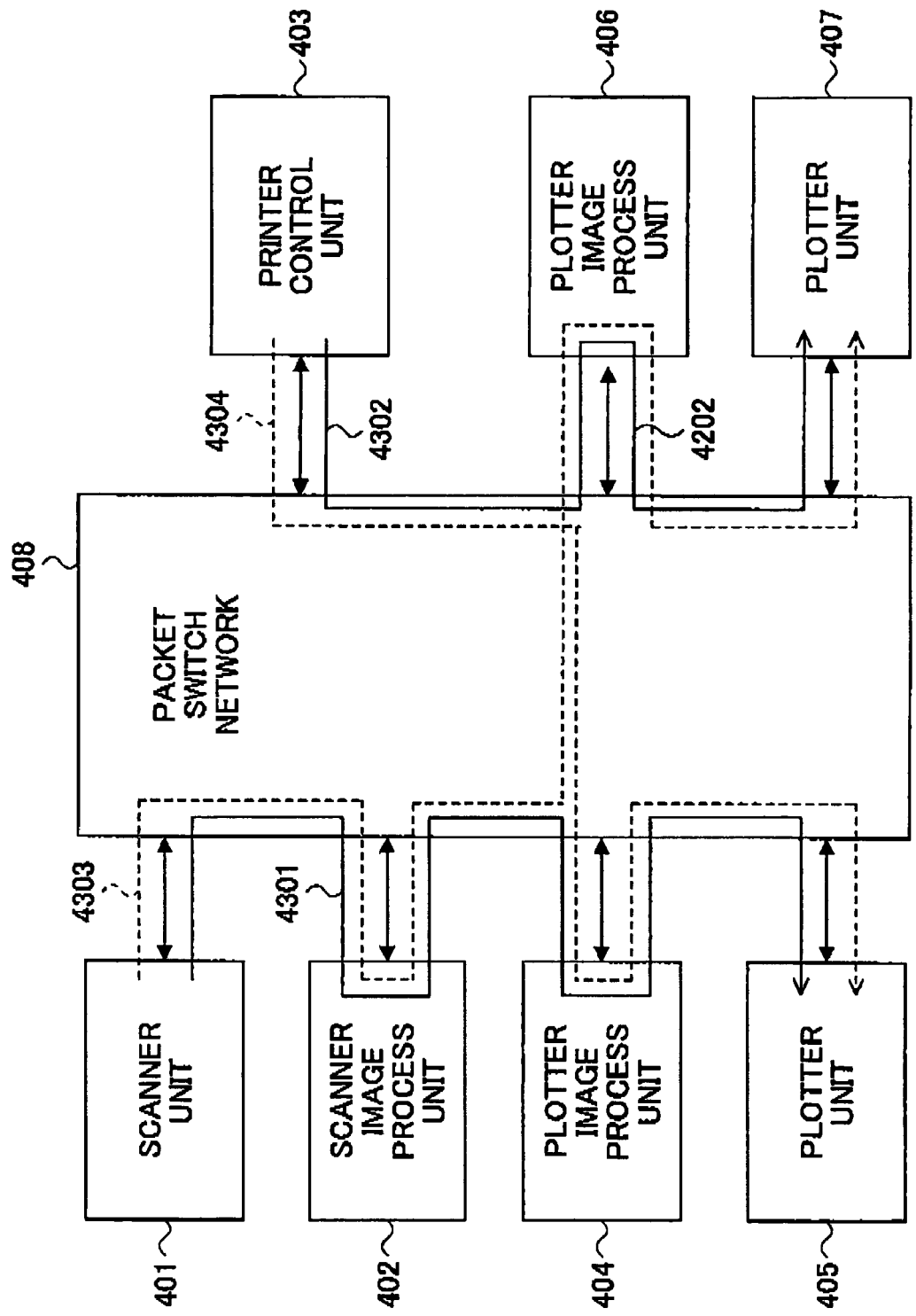
FIG. 19 is a block diagram showing a first variation of the image forming apparatus according to the fourth embodiment of the present invention.

FIG. 19 is a block diagram showing a first variation of the image forming apparatus according to the fourth embodiment of the present invention.

In FIG. 19, each operation of units in the image forming apparatus is the same as each operation of units shown in FIG. 18. The scanner unit 401, the scanner image process unit 402, the plotter image process units 404 and 406, the plotter units 405 and 407, and the printer control unit 403 are connected to the packet switch network 408.

Next, operations in the first variation of the image forming apparatus will be described. For example, a case, in which data read by the scanner unit 401 are formed to be an image by the plotter unit 405 and data from the printer control unit 403 are formed to be an image by the plotter unit 407, will be described.

As shown by a solid line 4301 in FIG. 19, data read by the scanner unit 401 are formed to be a packet, and transferred to the packet switch network 408. The packet switch network 408 transfers the packet to the scanner image process unit 402 based on a routing table which is defined beforehand. Data, which is sent to the scanner image process unit, are processed by the scanner image process unit 402 to be a packet, and are transferred to the packet switch network 408.

The packet switch network 408 transfers the packet to the plotter image process unit 404 based on the routing table, which is defined beforehand. The packet image process unit 404 receives the packet and processes the packet. After that, the packet image process unit 404 transfers the packet to the packet switch network 408. The packet switch network 408 transfers the packet to the plotter unit 405 based on the routing table, which is defined beforehand.

Data being transferred to the plotter unit 405 are formed to be an image by the plotter unit 405. Similarly, as shown by a solid line 402, data processed by the printer control unit 403 are formed to be a packet and are transferred to the packet switch network 408. The packet switch network 408 transfers the packet to the plotter image process unit 406 based on the routing table, which is defined beforehand.

The plotter image process unit 406 receives the packet and processes the packet. After that, the plotter image process unit 406 transfers the packet to the packet switch network 408. The packet switch network 408 transfers the packet to the plotter unit 407 based on the routing table, which is defined beforehand. Data being transferred to the plotter unit 407 are formed to be an image by the plotter unit 407.

For example, in a case in that data read by the scanner unit 401 are formed to be an image by the plotter unit 407 and data sent from the printer control unit 403 are formed to be an image by the plotter unit 405, similarly, data are formed to be a packet and are transferred to form to be an image in accordance with paths along the dashed lines 4303 and 4304.

Figure 20:
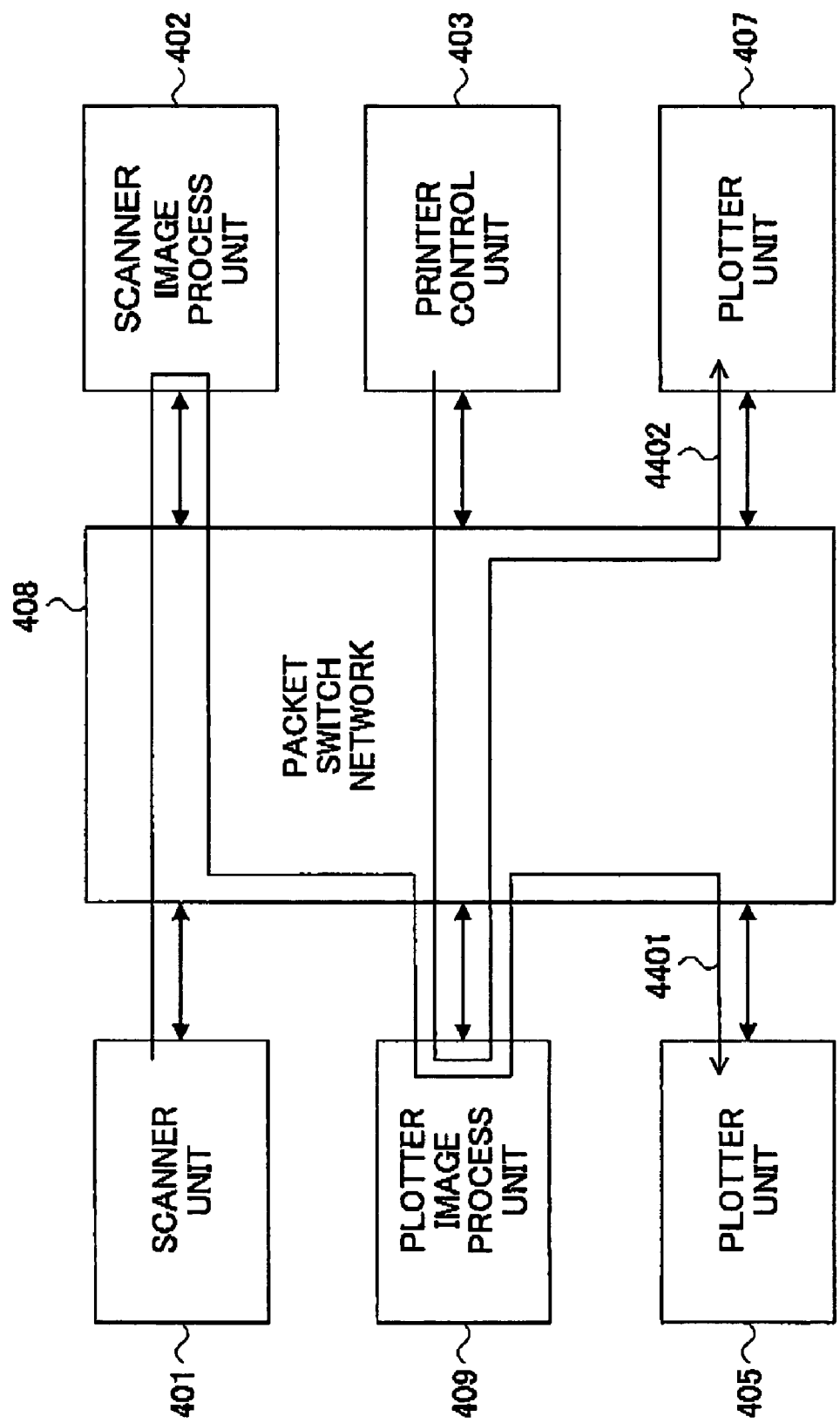
FIG. 20 is a block diagram showing a second variation of the image forming apparatus according to the fourth embodiment of the present invention.

FIG. 20 is a block diagram showing a second variation of the image forming apparatus according to the fourth embodiment of the present invention.

In FIG. 20, each operation of units are the same each operation of units shown in FIG. 18. All units are connected to the packet switch network 408.

Next, in FIG. 20 an operation in the second variation of the image forming apparatus will be described. For example, a case, in that data read by the scanner unit 401 are formed to be an image by the plotter unit 405 and data sent from the printer control unit 403 are formed to be an image by the plotter unit 407, will be described.

As shown by a solid line 4401 in FIG. 20, data read by the scanner unit 401 are formed to be a packet and are transferred to the packet switch network 408. The packet switch network 408 transfers the packet to the scanner image process unit 402 based on a routing table, which is defined beforehand. Data sent to the scanner image process unit 402 are processed by the scanner image process unit 402 to be a packet and transferred to the packet switch network 408.

The packet switch network 408 transfers the packet to the routing table, which is defined beforehand, to the plotter image process unit 409. The plotter image process unit 409 receives the packet and processes the packet. After that, the plotter image process unit 409 indicates a destination to the plotter unit 405, and transfers the data being formed to be a packet again to the packet switch network 408.

The packet switch network 408 transfers the packet based on the routing table, which is defined beforehand, to the plotter unit 405. Data transferred to the plotter unit 405 are formed to be an image by the plotter unit 405.

Similarly, as shown by a solid line 4402, data processed by the printer control unit 403 are formed to be a packet and transferred to the packet switch network 408. The packet switch network 408 transfers the packet to the plotter image process unit 409 based on the routing table, which is defined beforehand.

The plotter image process unit 409 receives the packet and processes for the packet. After that, the plotter image process unit 409 indicates a destination to the plotter unit 407 and transfers data, which are formed to be the packet again, to the packet switch network 408. The packet switch network 408 transfers the packet to the plotter unit 407 based on the routing table, which is defined beforehand. Data, which are transferred to the plotter unit 407, are formed to be an image by the plotter unit 407.

Figure 21:
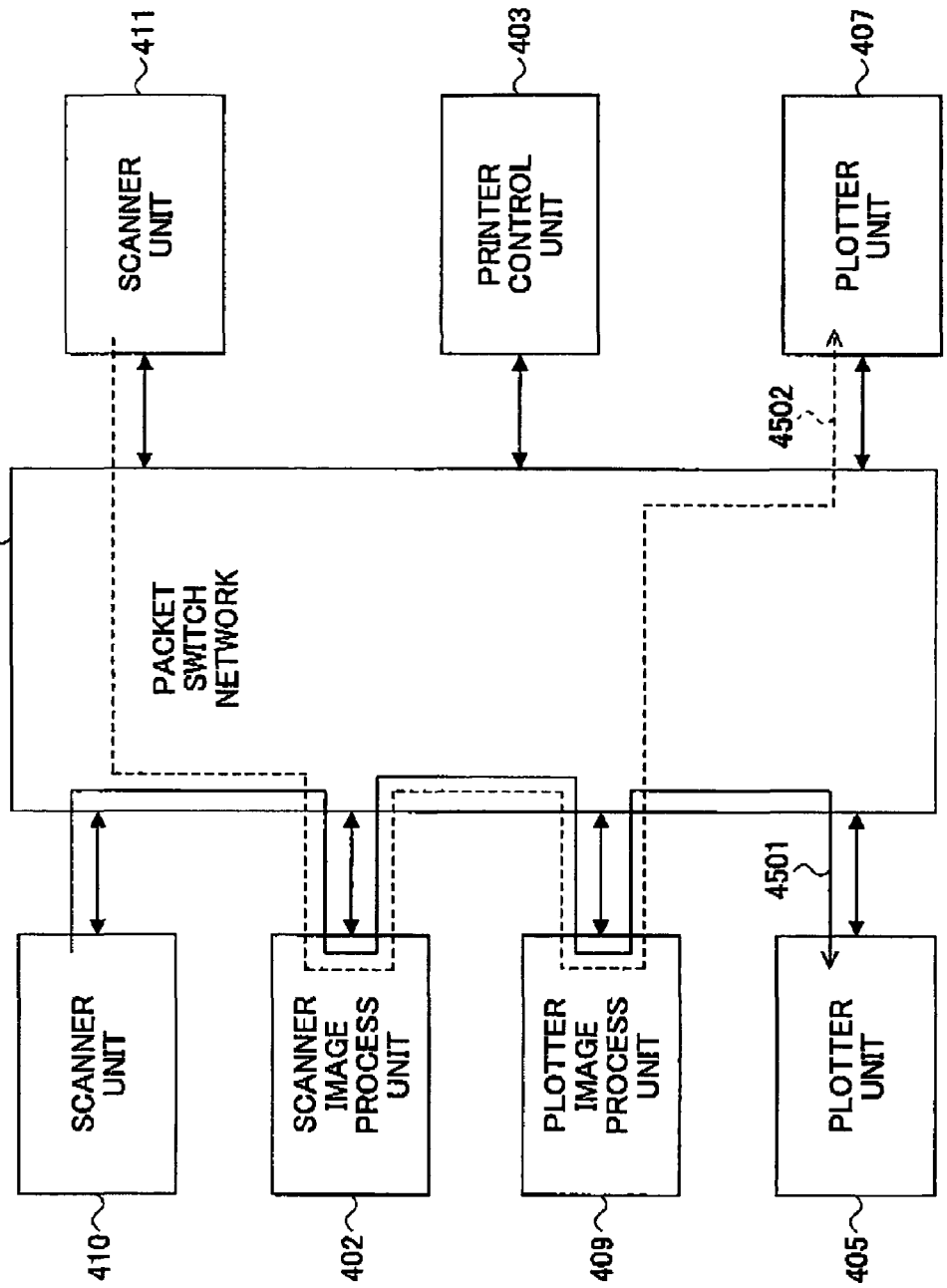
FIG. 21 is a block diagram showing a third variation of the image forming apparatus according to the fourth embodiment of the present invention.

FIG. 21 is a block diagram showing a third variation of the image forming apparatus according to the fourth embodiment of the present invention.

In FIG. 21, each operation of units is the same as each operation of units shown in FIG. 18. All units are connected to the packet switch network 408.

Next, an operation in the third variation of the image forming apparatus will be described with reference to FIG. 21. For example, a case, in which data read by the scanner unit 410 are formed to be an image by the plotter unit 405 and data sent from the printer control unit 403 are formed to be an image by the plotter unit 407, will be described.

As shown by a solid line 4501 in FIG. 21, data read by the scanner unit 410 are formed to be a packet and transferred to the packet switch network 408. The packet switch network 408 transfers the packet to the scanner image process unit 402 based on the routing table, which is defined beforehand. Data, which are transferred to the scanner image process unit 402, are processed by the scanner image process unit 402. After that, the data are formed to be a packet and transferred to the packet switch network 408.

The packet switch network 408 transfers the packet to the plotter image process unit 409 based on the routing table, which is defined beforehand. The plotter image process unit 409 receives the packet, and processes the packet. After that, the plotter image process unit 409 indicates a destination to the plotter unit 405 and transfers the data, which are formed to be the packet again, to the packet switch network 408. The packet switch network 408 transfers the packet to the plotter unit 405 based on the routing table, which is defined beforehand.

Data being transferred to the plotter unit 405 are formed to be an image by the plotter unit 405. Similarly, as shown by a dashed line 4502 in FIG. 21, data read by the scanner unit 411 are formed to be a packet and transferred to the packet switch network 408. The packet switch network 408 transfers the packet to the scanner image process unit 402 based on the routing table, which is defined beforehand.

Data set to the scanner image process unit 402 are processed by the scanner image process unit 402. After that, the data are transferred to the packet switch network 408. The packet switch network 408 transfers the packet to the plotter image process unit 409 based on the routing table, which is defined beforehand.

The plotter image process unit 409 receives the packet and processes the packet. After that, the plotter image process unit 409 indicates a destination to the plotter unit 407 and transfers data, which are formed to be the packet again, to the packet switch network 408. The packet switch network 408 transfers the packet to the plotter unit 407 based on the routing table, which is defined beforehand. The data sent to the plotter unit 407 are formed to be an image by the plotter unit 407.

Figure 22:
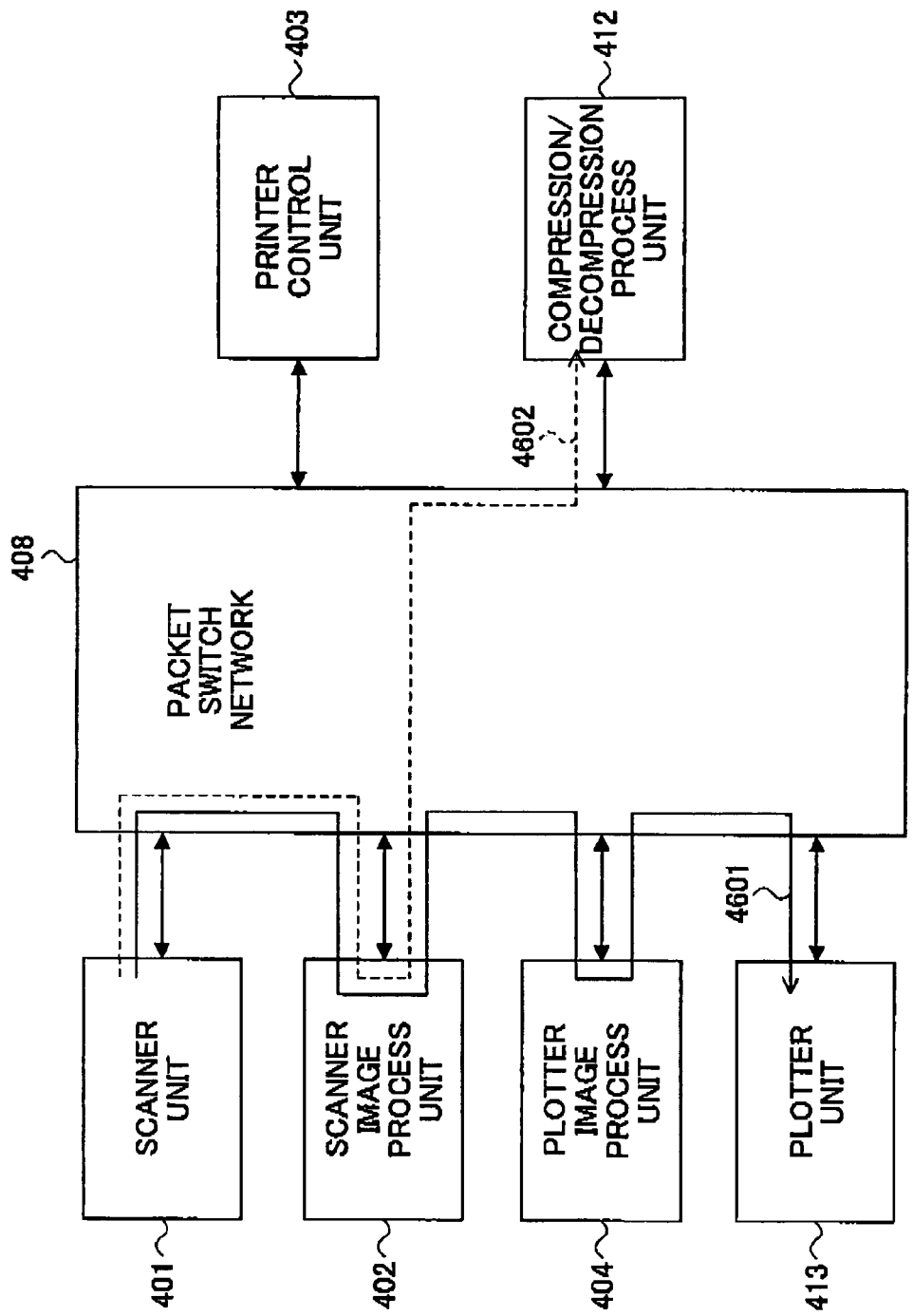
FIG. 22 is a block diagram showing a fourth variation of the image forming apparatus according to the fourth embodiment of the present invention.

FIG. 22 is a block diagram showing a fourth variation of the image forming apparatus according to the fourth embodiment of the present invention.

In FIG. 22, each operation of units are the same as each operation of the units shown in FIG. 18. A compression/decompression process unit 412 is a unit for compressing and decompressing data. All units are connected to the packet switch network 408.

Next, an operation in the fourth variation of the image forming apparatus will be described with reference to FIG. 22. For example, a case, in which data read by the scanner unit 401 are formed to be an image by the plotter unit 414 and data read by the scanner unit 401 are compressed by the compression/decompression process unit 412, will be described. As shown by a solid line 4601, data read by the scanner unit 401 are formed to be a packet and transferred to the packet switch network 408.

The packet switch network 408 transfers the packet to the scanner image process unit 402 based on the routing table, which is defined beforehand. Data sent to the scanner image process unit 402 are processed by the scanner image process unit 402. After that, the data are formed to be a packet and transferred to the packet switch network 408. The packet switch network 408 transfers the packet to the plotter image process unit 404 based on the routing table, which is defined beforehand.

The plotter image process unit 404 receives the packet and processes the packet. After that, data are formed to be a packet and transferred to the packet switch network 408. The packet switch network 408 transfers the packet to the plotter unit 413 based on the routing table, which is defined beforehand. The data set to the plotter unit 413 are formed to be an image by the plotter unit 413.

Similarly, as shown by a solid line 4602 in FIG. 22, data read by the scanner unit 401 are formed to be a packet and transferred to the packet switch network 408. The packet switch network 408 transfers the packet to the scanner image process unit 402 based on the routing table, which is defined beforehand.

Data sent to the scanner image process unit 402 are processed by the scanner image process unit 402. After that, the data are formed to be a packet and transferred to the packet switch network 408. The packet switch network 408 transfers the packet to the compression/decompression process unit 412 based on the routing table, which is defined beforehand. The compression/decompression process unit 412 receives the packet and conducts a data compression process.

Figure 23:
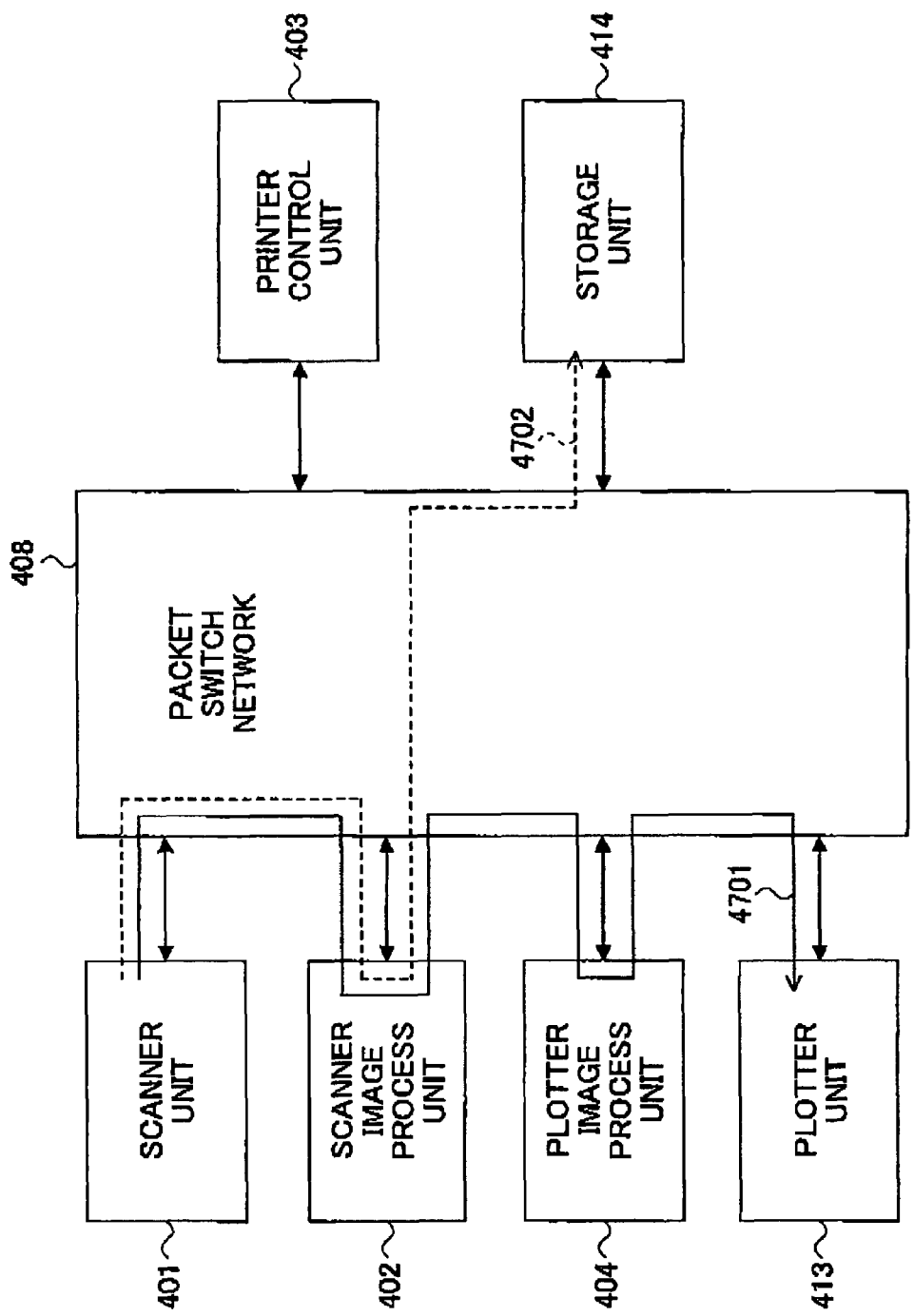
FIG. 23 is a block diagram showing a fifth variation of the image forming apparatus according to the fourth embodiment of the present invention.

FIG. 23 is a block diagram showing a fifth variation of the image forming apparatus according to the fourth embodiment of the present invention. In FIG. 23, each operation of units is the same as each operation of the units shown in FIG. 18. For example, a storage unit 414 is a unit including a storage device such as a HDD (Hard Disk Device), a CD-R/W, or a like. All units are connected to the packet switch network 408.

Next, an operation in the fifth variation of the image forming apparatus will be described with reference to FIG. 23. For example, a case, in that data read by the scanner unit 401 are formed to be an image by the plotter unit 413 and data read by the scanner unit 401 are stored, will be described.

As shown by a solid line 4701 in FIG. 23, data read by the scanner unit 401 are formed to be a packet and transferred to the packet switch network 408. The packet switch network 408 transfers the packet to the scanner image process unit 402 based on a routing table, which is defined beforehand. Data sent to the scanner image process unit 402 are processed by the scanner image process unit 402. After that, the data are formed to be a packet and transferred to the packet switch network 408.

The packet switch network 408 transfers the packet to the plotter image process unit 404 based on the routing table, which is defined beforehand. The plotter image process unit 404 receives the packet and processes the packet. After that, data are formed to be a packet and transferred to the packet switch network 408. The packet switch network 408 transfers the packet to the plotter unit 413 based on the routing table, which is defined beforehand.

Data sent to the plotter unit 413 are formed to an image by the plotter unit 413. Similarly, as shown by a dashed line 4702 in FIG. 23, data read by the scanner unit 401 are formed to be a packet and transferred to the packet switch network 408. The packet switch network 408 transfers the packet to the scanner image process unit 402 based on the routing table, which is defined beforehand.

The data sent to the scanner image process unit 402 are processed by the scanner image process unit 402. After that, the data are formed to be a packet and transformed to the packet switch network 408. The packet switch network 408 transfers the packet to the storage unit 414 based on the routing table, which is defined beforehand. The storage unit 414 receives the packet and stores data.

Figure 24:
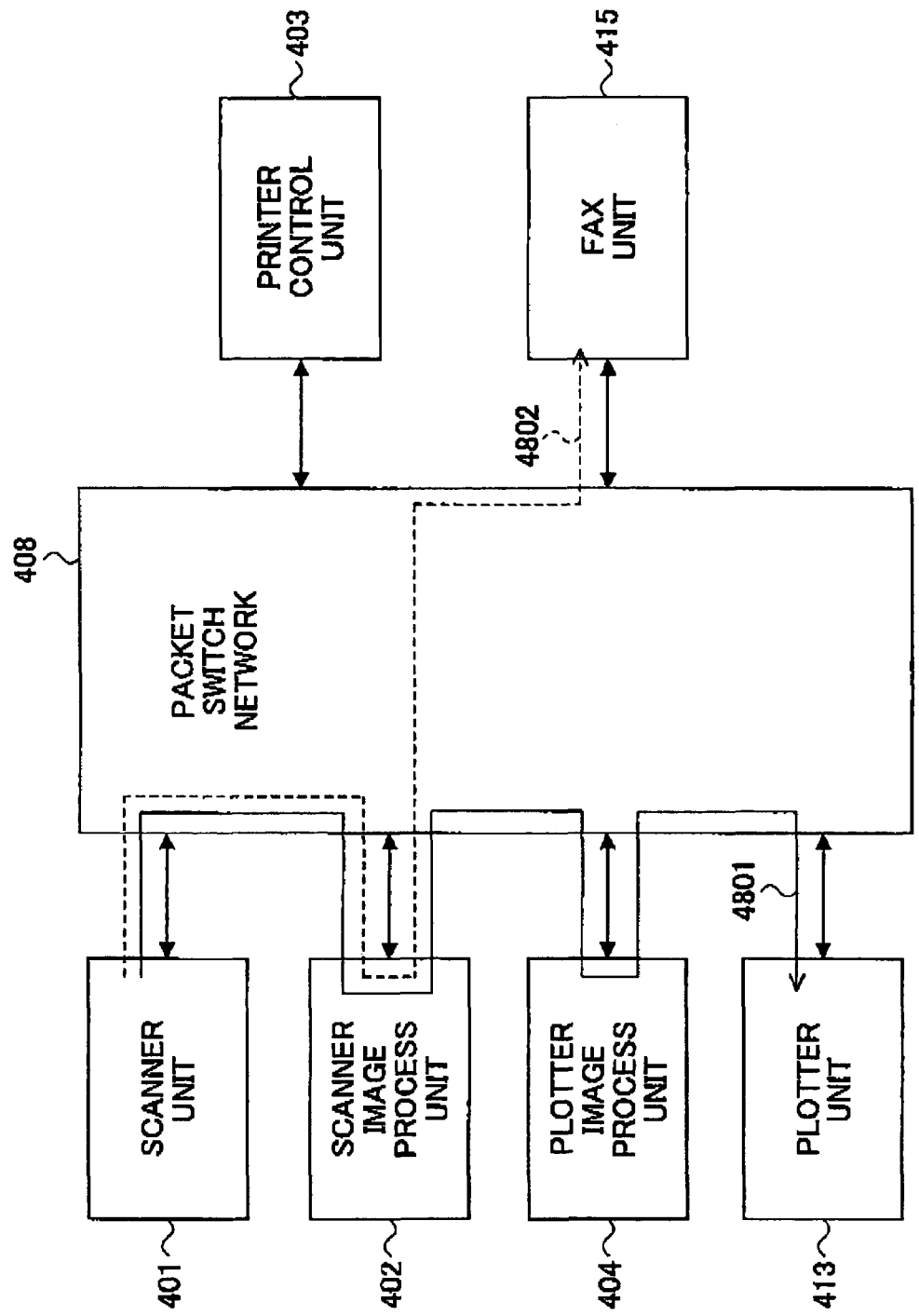
FIG. 24 is a block diagram showing a sixth variation of the image forming apparatus according to the fourth embodiment of the present invention.

FIG. 24 is a block diagram showing a sixth variation of the image forming apparatus according to the fourth embodiment of the present invention. In FIG. 24, each operation of units are the same as each operation of the units shown in FIG. 18. For example, a FAX unit 415 is a unit having a FAX send/receive function. All units are connected to the packet switch network 408.

Next, an operation in the sixth variation of the image forming apparatus according to the fourth embodiment of the present invention will be described. For example, a case, in which data read by the scanner unit 401 are formed to be an image by the plotter unit 413 and data read by the scanner unit 401 are sent by fax by the FAX unit 415, will be described.

As shown by a solid line 4801 in FIG. 24, data read by the scanner unit 401 are formed to be a packet and transferred to the packet switch network 408. The packet switch network 408 transfers the packet to the scanner image process unit 402 based on the routing table, which is defined beforehand. Data sent to the scanner image process unit 402 are processed by the scanner image process unit 402. After that, the data are formed to be a packet and transferred to the packet switch network 408.

The packet switch network 408 transfers the packet to the plotter image process unit 404 based on the routing table, which is defined beforehand. The plotter image process unit 404 receives the packet processes the packet. After that, the data are formed to be the packet again and transformed to the packet switch network 408. The packet switch network 408 transfers the packet to the plotter unit 413 based on the routing table, which is defined beforehand. Data sent to the plotter unit 413 are formed to be an image by the plotter unit 413.

Similarly, as shown by a dashed line 4802 in FIG. 24, data read by the scanner unit 401 are formed to be a packet and transferred to the packet switch network 408. The packet switch network 408 transfers the packet to the scanner image process unit 402 based on the routing table, which is defined beforehand. Data sent to the scanner image process unit 402 are processed by the scanner image process unit 402. After that, the data are formed to be a packet and transferred to the packet switch network 408.

The packet switch network 408 transfers the packet to the FAX unit 415 based on the routing table, which is defined beforehand. The FAX unit 415 receives the packet and conducts a FAX sending process.

Figure 25:
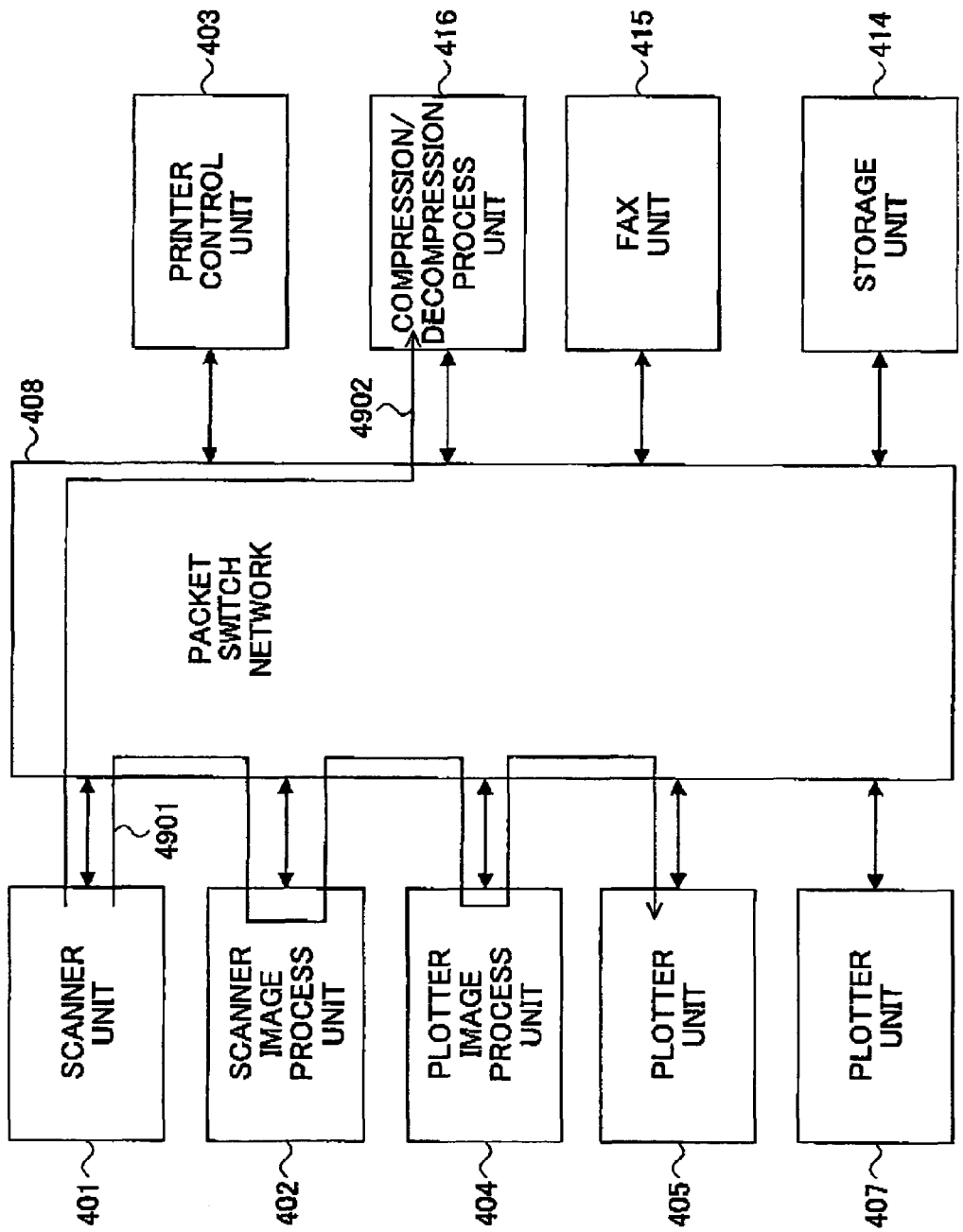
FIG. 25 is a block diagram showing a seventh variation of the image forming apparatus according to the fourth embodiment of the present invention.

FIG. 25 is a block diagram showing a seventh variation of the image forming apparatus according to the fourth embodiment of the present invention. It is assumed that data read from the scanner unit 401 are RGB data. A case in which the plotter unit 405 forms an image shown by a solid line 4901 in FIG. 25, and similarly, a case in which the image compression/depression unit 416 compresses data as shown by a solid line 4902 in FIG. 25 are considered in the following.

Generally, the scanner image process unit 402 converts RGB data from the scanner unit 401 into YMCK data. In a case of a monitor display by a compression process by the image compression/decompression process unit 416, preferably, the RGB data without being compressed are compressed. Thus, as shown by the solid line 4902, a packet transmission is directly conducted without passing through the scanner image process unit 402. By handling data being the RGB data themselves at the packet switch network 408, it is possible to improve a productivity of a system.

Figure 26:
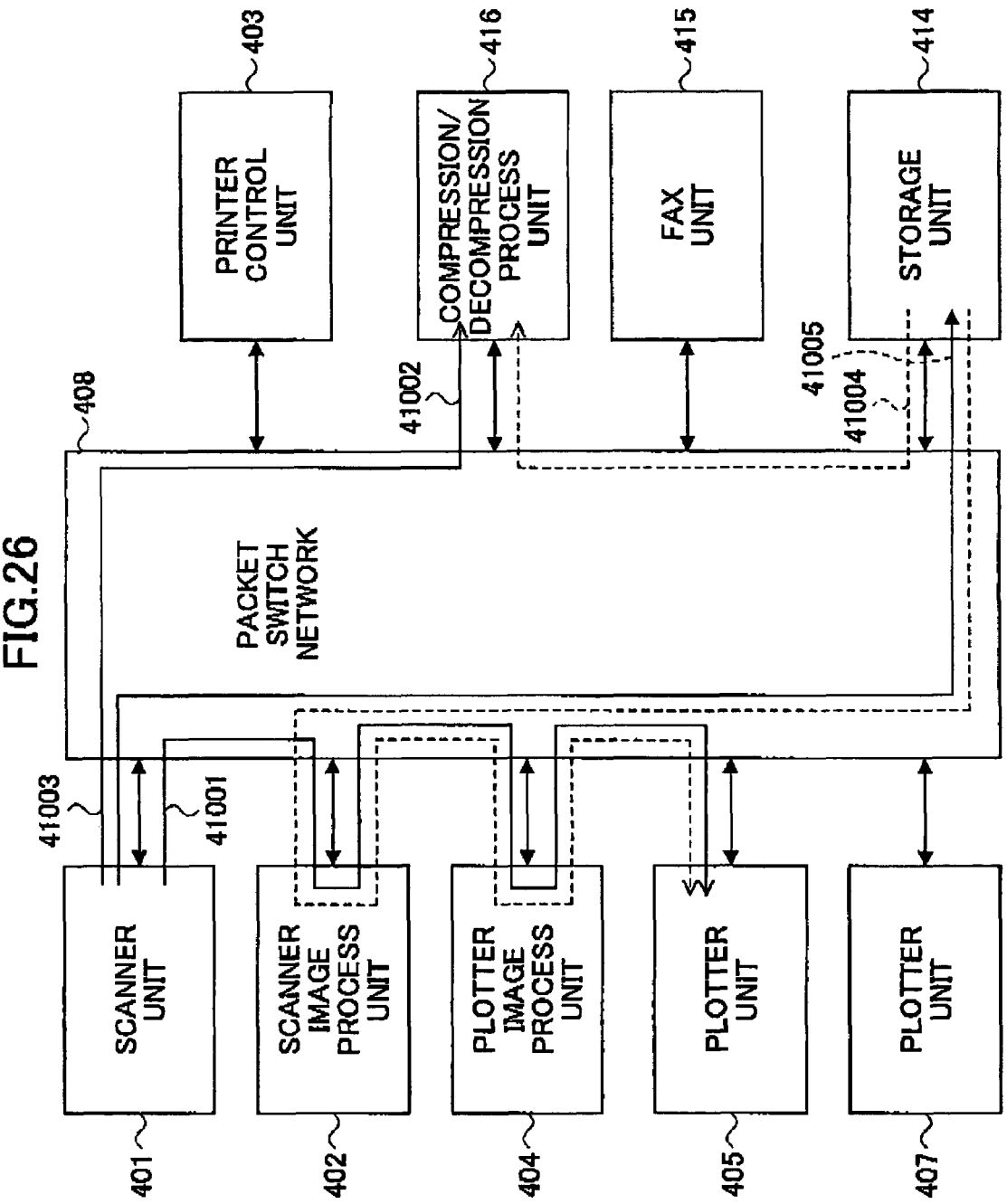
FIG. 26 is a block diagram showing an eighth variation of the image forming apparatus according to the fourth embodiment of the present invention.

FIG. 26 is a block diagram showing an eighth variation of the image forming apparatus according to the fourth embodiment of the present invention. Operations in accordance with the solid lines 41001 and 41002 in FIG. 26 are the same as the operations shown in the seventh variation of the image forming apparatus in FIG. 25. Similarly, the RGB data themselves are stored in the storage unit 414 as shown by the solid line 41003. If a process in accordance with the solid line 41001 or 41002 failed during the processes or if an additional process is conducted, it is possible to conduct the process in accordance with a dashed line 41004 or 41005 by using the RGB data stored in the storage unit 414.

As described above, according to the fourth embodiment of the present invention, first, it is possible to realize a data transmission at high speed and improve the productivity of the system. It is possible to provide an image forming apparatus that can significantly improve scalability of the system.

Second, it is possible to handle data before a scanner image process. Therefore, it is possible to provide an image forming apparatus that can realize a function which is not provided by a conventional image forming apparatus.

Third, a scanner image process unit is independently provided, so that it is possible to flexibly correspond to a change or an upgrade of a function. In addition, it is possible to develop a model of a different specification on the same platform, and it is possible to provide an image forming apparatus that can improve a development efficiency.

Fourth, a plotter image process unit is independently provided, so that it is possible to flexibly correspond to a change or an upgrade of a function. In addition, it is possible to provide an image forming apparatus that can realize a system while suppressing an expense.

Fifth, data before a scanner image process can be handled, so that it is possible to provide an image forming apparatus that can realize a function which is not realized by a conventional image forming apparatus.

Sixth, with respect to data to be used by a different image process or a compression process, original data having original information can be used. Therefore, it is possible to provide an image forming apparatus in that each of units can conduct a suitable data process.

Seventh, with respect to data to be used by a different image process or a compression process, original data having original information can be reused. Therefore, it is possible to provide an image forming apparatus in that each of units can conduct a suitable data process.

Fifth Embodiment

Figure 27:
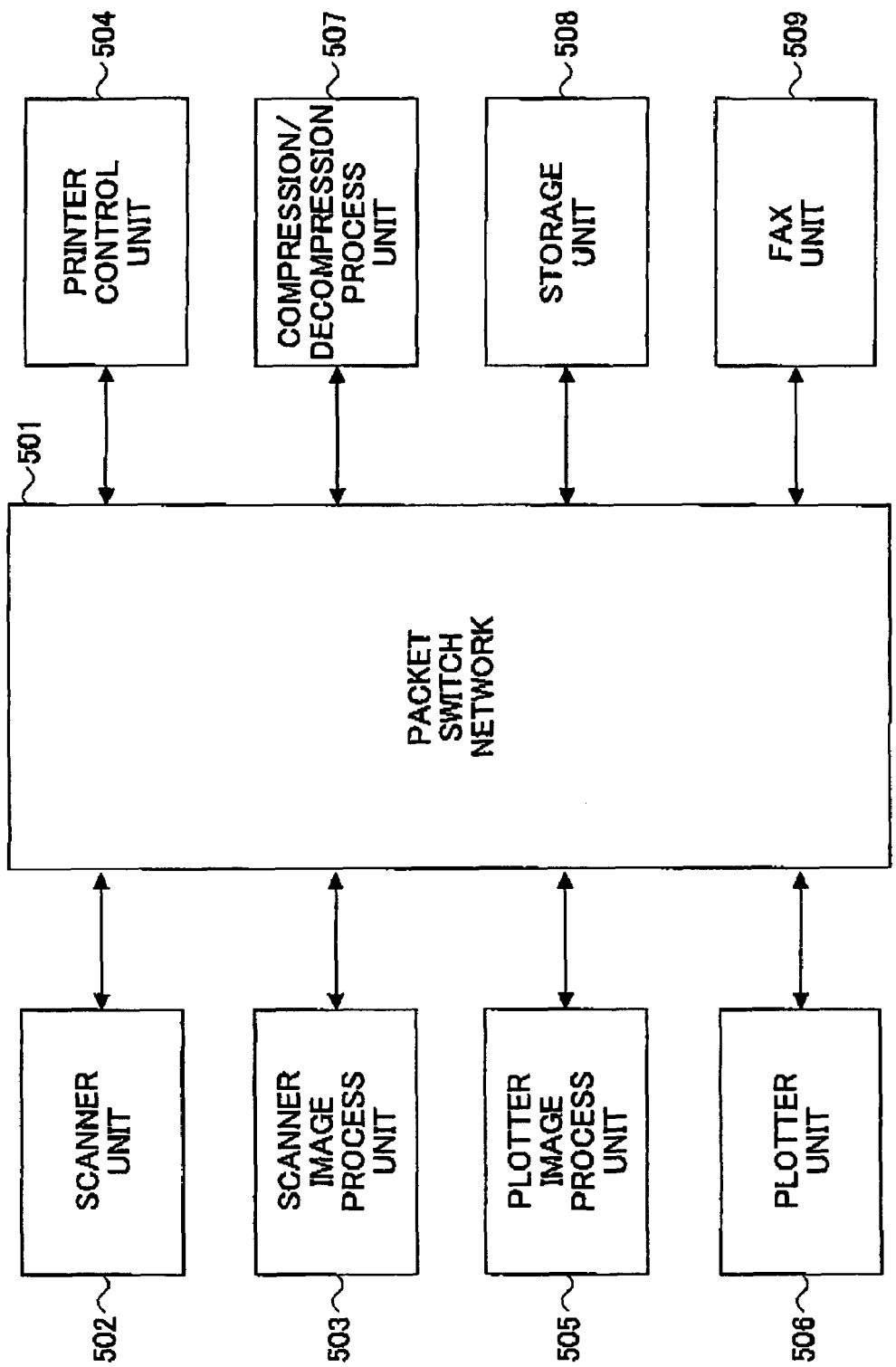
FIG. 27 is a block diagram showing an image forming apparatus according to a fifth embodiment of the present invention.

FIG. 27 is a block diagram showing an image forming apparatus according to a fifth embodiment of the present invention. In the image forming apparatus shown in FIG. 27, various function units are connected to a packet switch network 501, and include functions for sending multicast data.

As the function units, the image forming apparatus include a scanner image process unit 503 for conducing a color conversion process and various filtering processes, a printer control unit 504, which includes a connection function to connect to an external network, for converting data described in a printer language into image data and rotating an image, a plotter image process unit 505 for conducting various filtering processes to sufficiently utilize process characteristics of a plotter, conducting a latent image formation by a LD (Laser Diode), and adhering toners to form an image, a compression/decompression process unit 507 for conducting a compression/decompression process for data, a storage unit 508 including a storage device such as a HDD (Hard Disk Device), a CD-R/W, or a like, and a FAX unit 509 having a FAX send/receive function.

In FIG. 28 through FIG. 35, packet data sent from various function units in the image forming apparatus shown in FIG. 27 to the packet switch network 501 are multicast data, and one unit sends the packet data to a plurality of other units.

Figure 28:
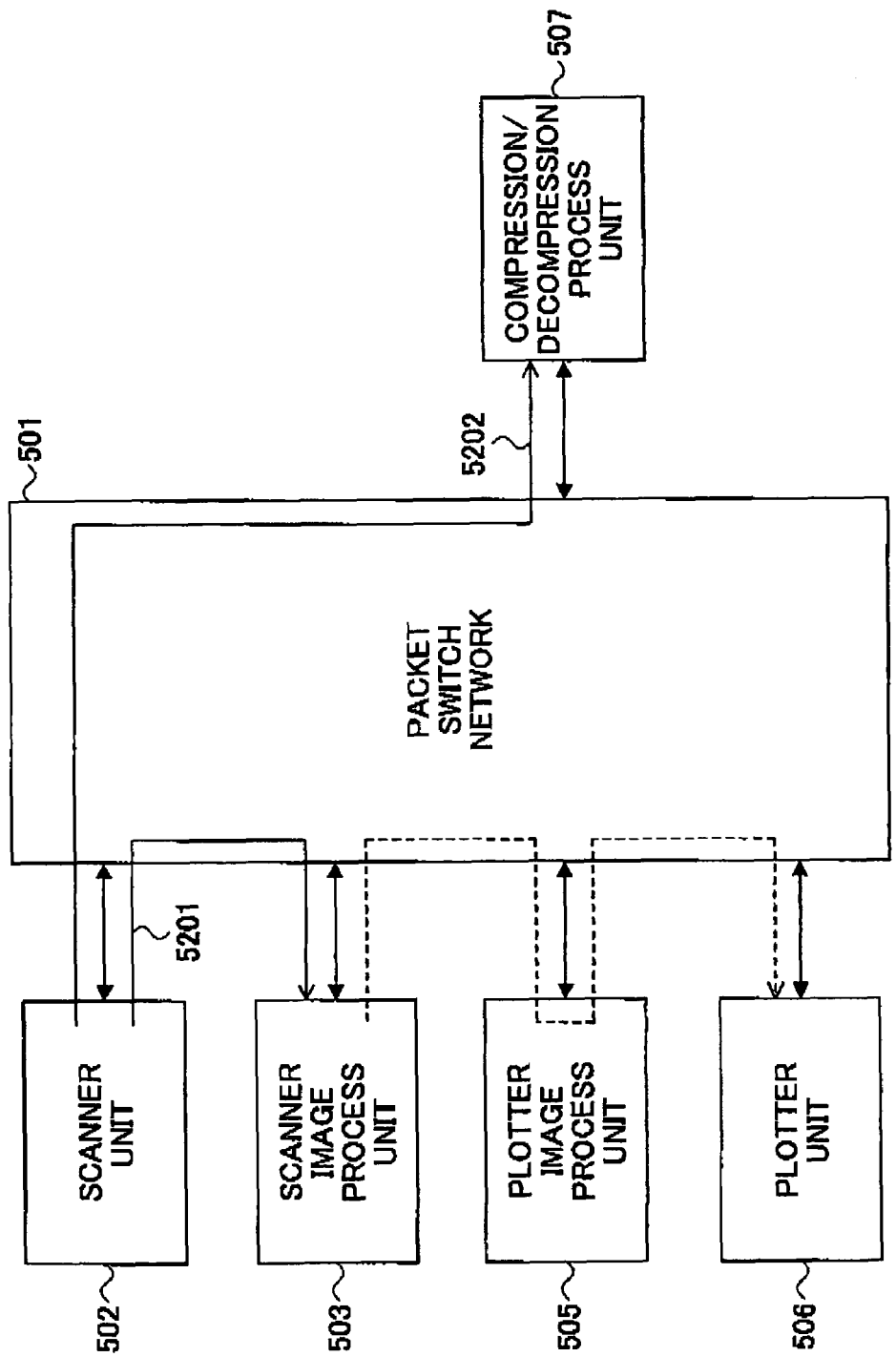
FIG. 28 is a block diagram showing a first multicast data transmission in the image forming apparatus according to the fifth embodiment of the present invention.

FIG. 28 is a block diagram showing a first multicast data transmission in the image forming apparatus according to the fifth embodiment of the present invention. In the first multicast data transmission, a case in that data read by the scanner unit 502 are formed to be an image by the plotter unit 506 and a case in that data are compressed by the compression/decompression process unit 507 are considered. Generally, data sent from the scanner unit 502 are RGB data, converted into YMCK data by the scanner image process unit 503, and then processed to print out.

In addition, the RGB data from the scanner unit 502 are compressed by the compression/decompression process unit 507 as RGB data, and are used for a monitor display. If a data transmission is conducted to the scanner image process unit 503 and the compression/decompression process unit 507 by a multicast, the data transmission can be conducted only one time.

Figure 29:
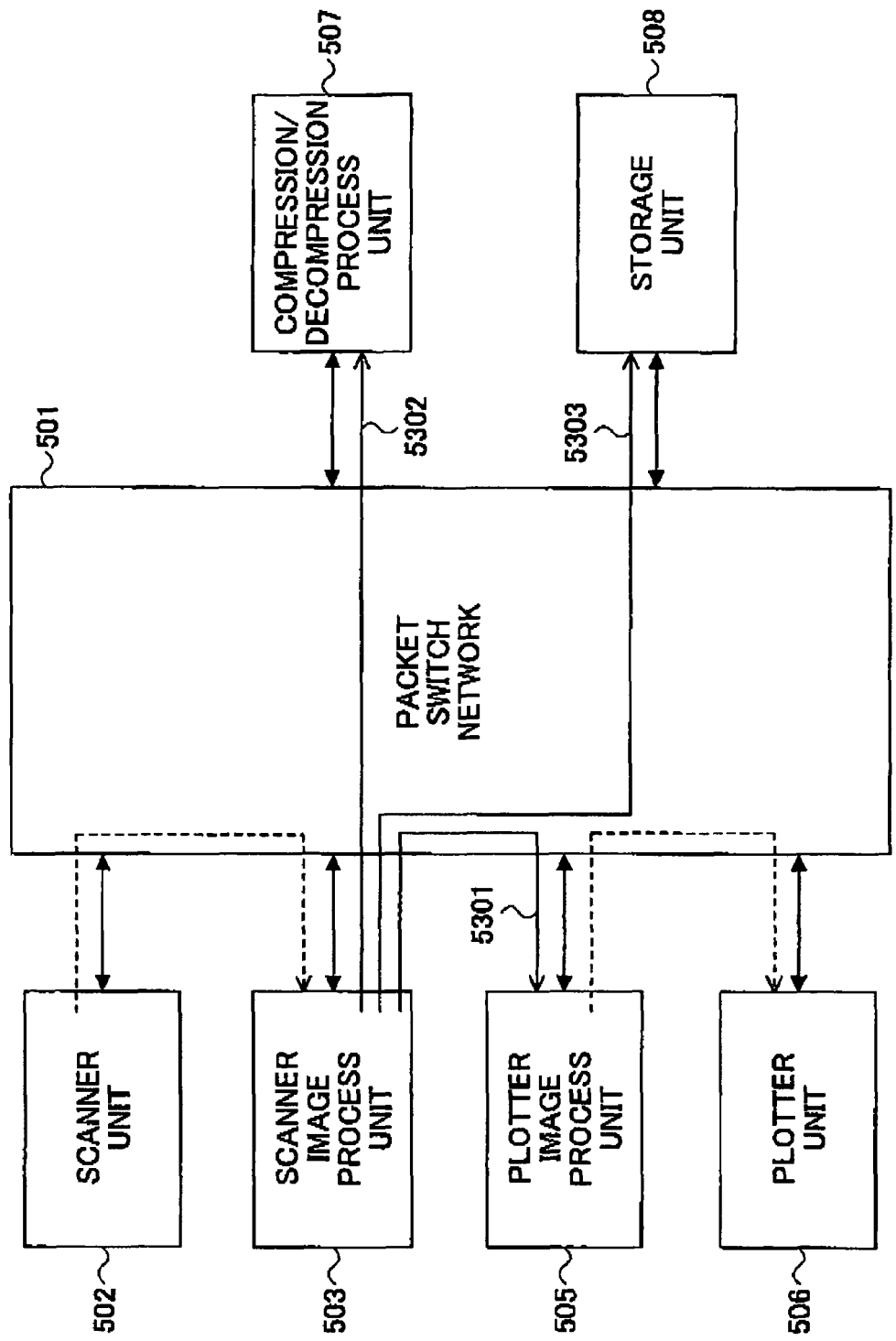
FIG. 29 is a block diagram showing a second multicast data transmission in the image forming apparatus according to the fifth embodiment of the present invention.

FIG. 29 is a block diagram showing a second multicast data transmission in the image forming apparatus according to the fifth embodiment of the present invention. Data read by the scanner unit 502 are formed to be a packet and are transmitted to the scanner image process unit 503 through the packet switch network 501. The data sent to the scanner image process unit 503 are processed by the scanner image process unit 503. After that, the data are formed to be a packet. In FIG. 29, a case in that image data to be the packet are output from the plotter unit 506 (path 5301), a case in that the compression/decompression process is conducted (path 5302), and a case in that data are recorded in the storage unit 508 are shown.

From the scanner image process unit 503, image data are transmitted to the plotter image process unit 505, the compression/decompression process unit 507, and the storage unit 508. Accordingly, a data transmission time can be for only one transmission. In a case in that data being compressed are recorded in the storage unit 508, the multicast is conducted for two paths 5301 and 5302 in FIG. 29. Since image data being compressed are transferred from the compression/decompression process unit 507 to the storage unit 508, a path 5303 is not used. In this case, since the multicast is conducted via two paths 5301 and 5302, it is possible to shorten the transmission time.

Figure 30:
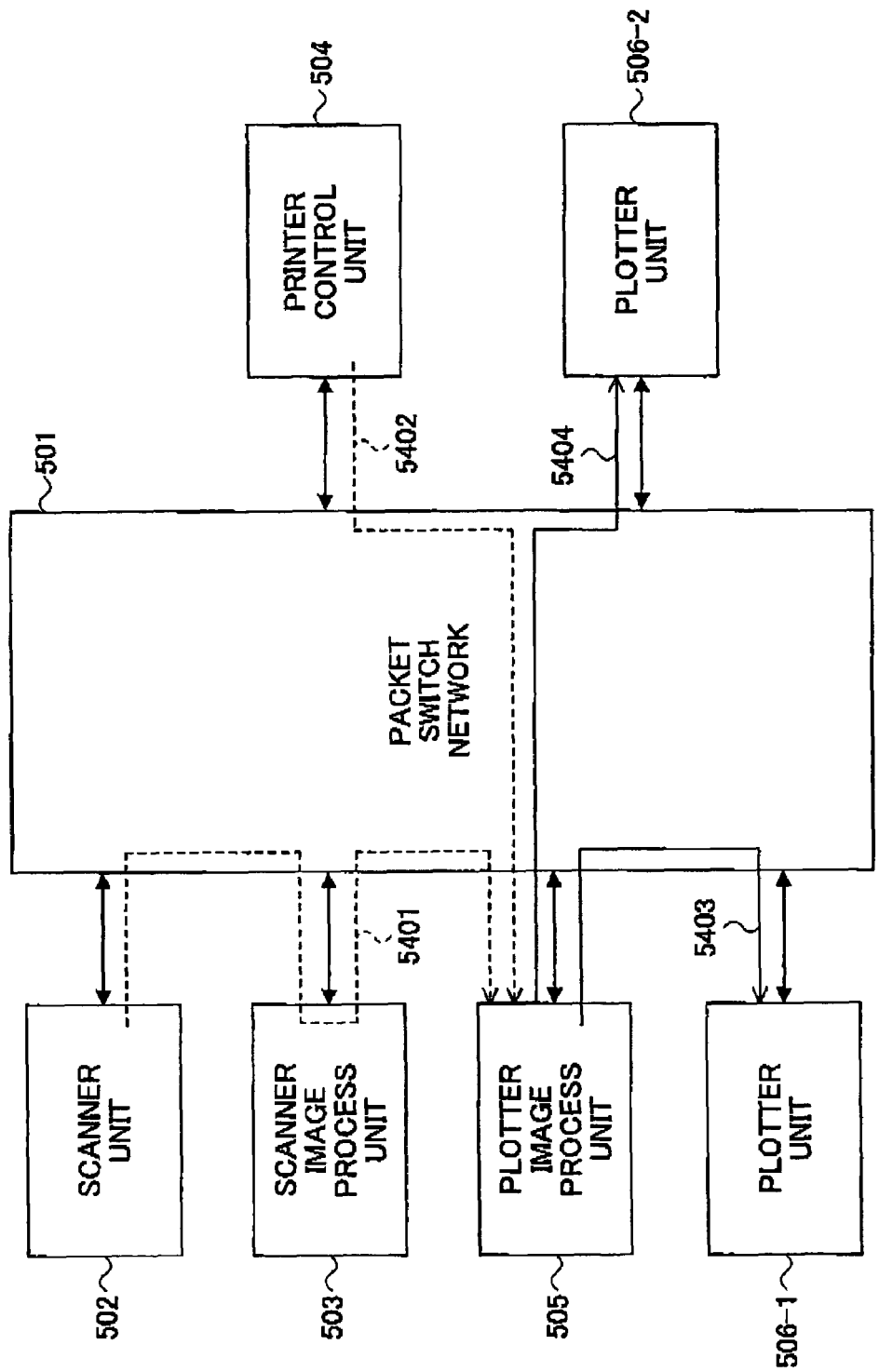
FIG. 30 is a block diagram showing a third multicast data transmission in the image forming apparatus according to the fifth embodiment of the present invention.

FIG. 30 is a block diagram showing a third multicast data transmission in the image forming apparatus according to the fifth embodiment of the present invention. In the third multicast data transmission, the image forming apparatus includes a plurality of plotter units 506-1 and 506-2 for forming an image to print out a large amount. That is, image data read by the scanner unit 502 are printed out by a plurality of plotter units 506-1 and 506-2 or data received by the printer control unit 504 are printed out by the plurality of plotter units 506-1 and 506-2.

Image data read by the scanner unit 502 are formed to be a packet, and transferred to the scanner image process unit 503 through the packet switch network 501 and are processed by the scanner image process unit 503. After that, the image data are formed to be a packet by the scanner image process unit 503 and transferred to the plotter image process unit 505 through the packet switch network 501 (path 5401). In addition, data received by the printer control unit 504 are processed. After that, the data are formed to be a packet and transferred to the plotter image process unit 505 through the packet switch network 501 (path 5402).

The plotter image process unit 505 receives and processes packet data. After that, the data are formed to be a packet and transferred to the plurality of plotter units 506-1 and 506-2 by the multicast. The plurality of plotter units 506-1 and 506-2 receive the data, form the data to be an image, and output the image.

Figure 31:
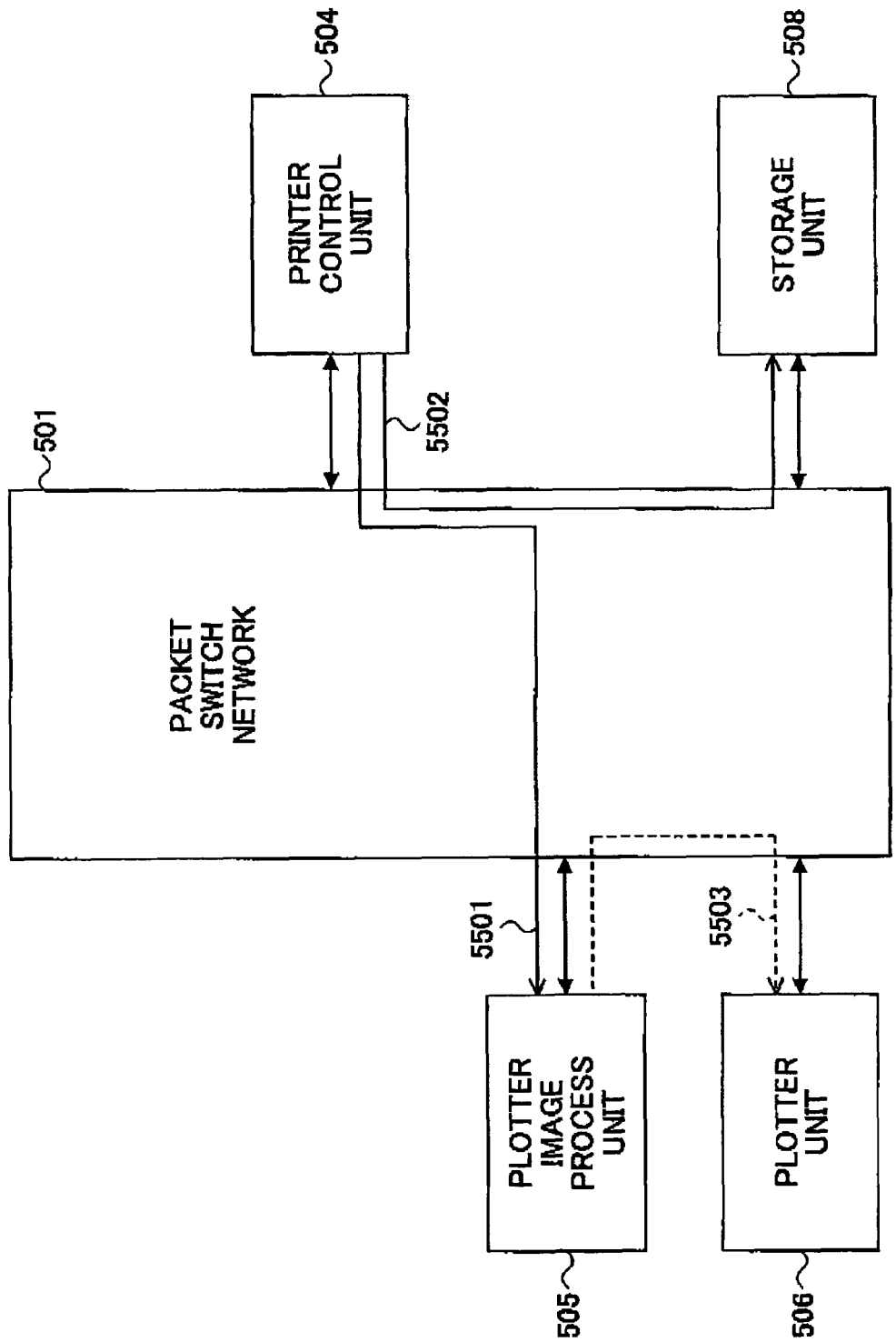
FIG. 31 is a block diagram showing a fourth multicast data transmission in the image forming apparatus according to the fifth embodiment of the present invention.

FIG. 31 is a block diagram showing a fourth multicast data transmission in the image forming apparatus according to the fifth embodiment of the present invention. In the fourth multicast data transmission, image data received by the printer control unit 504 are output from the plotter unit 506 or recorded in the storage unit 508.

The image data received by the printer control unit 504 are formed to be a packet. After that, the packet is transferred to the packet switch network 501 by the multicast and transferred to the plotter image process unit 505 (path 5501). Also, the packet is transferred to the storage unit 508 (path 5502). The plotter image process unit 505 receives data and processes the data. After that, the data is formed to be a packet and transferred to the plotter unit 506 through the packet switch network 501 (path 5503), and then are formed to be an image and printed out. Also, data sent to the storage unit 508 via the path 5502 are recorded to a recording medium.

Figure 32:
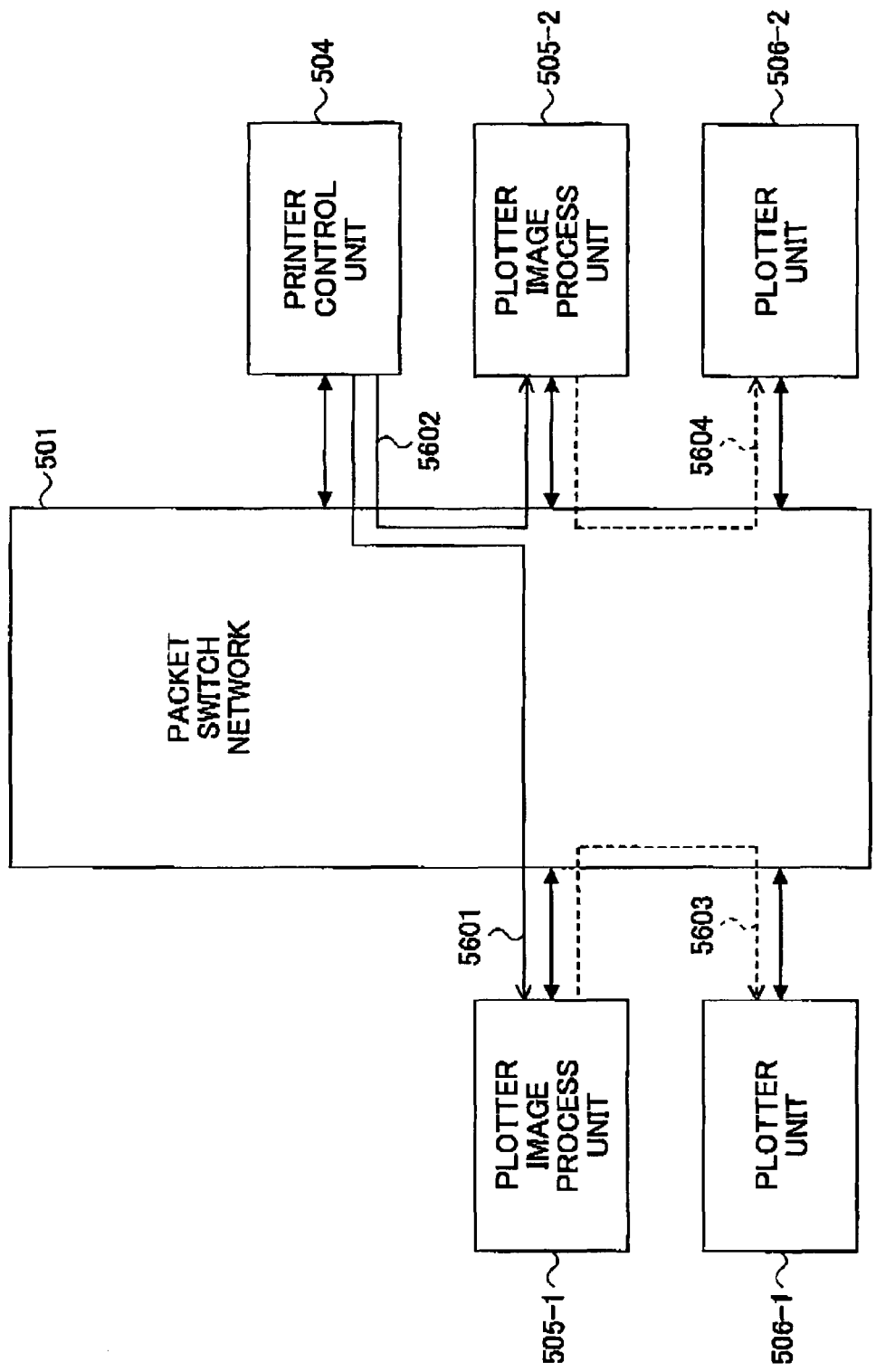
FIG. 32 is a block diagram showing a fifth multicast data transmission in the image forming apparatus according to the fifth embodiment of the present invention.

FIG. 32 is a block diagram showing a fifth multicast data transmission in the image forming apparatus according to the fifth embodiment of the present invention. In the fifth data transmission, the image forming apparatus includes a plurality of the plotter units 506 (506-1 and 506-2) for forming an image to print out a large amount.

The printer control unit 504 receives data and processes the data. After that, the data are formed to be a packet and transferred to the packet switch network 501 and sent to the plotter image process unit 505-1 (path 5601). Also, the packet is sent to the plotter image process unit 505-2 (path 5602).

The plotter image process unit 505-1 receives and processes data. After that, the data are formed to be a packet and sent to the plotter unit 506-1 through the packet switch network 501 (path 5603). Then, the packet is formed to be an image by the plotter unit 506-1. Similarly, the plotter image process unit 505-2 receives and processes data. After that, the data are sent to the plotter unit 506-2 through the packet switch network 501 (path 5604) and formed to be an image.

Figure 33:
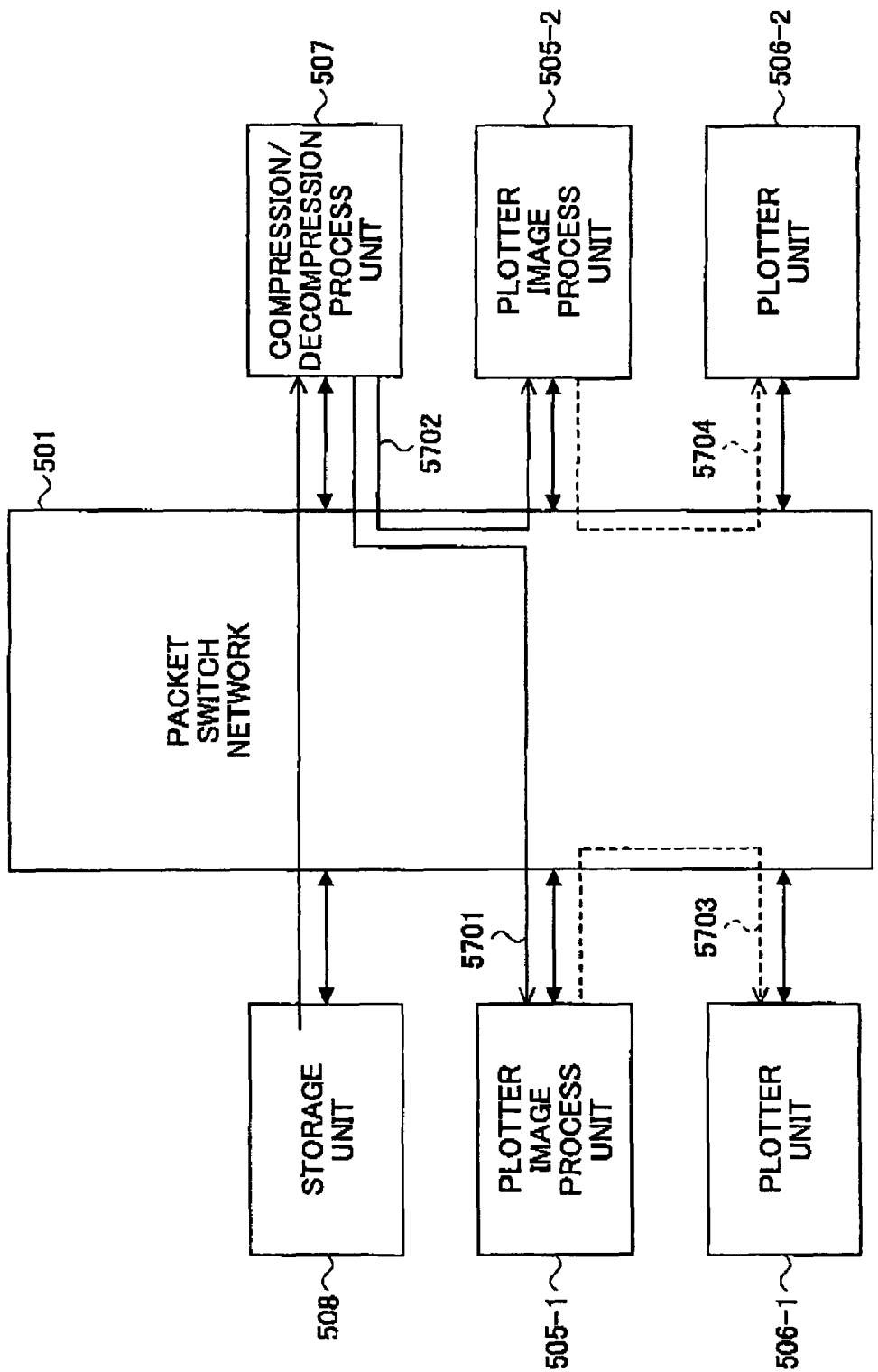
FIG. 33 is a block diagram showing a sixth multicast data transmission in the image forming apparatus according to the fifth embodiment of the present invention.

FIG. 33 is a block diagram showing a sixth multicast data transmission in the image forming apparatus according to the fifth embodiment of the present invention. In the sixth multicast data transmission, image data being compressed and recorded in the storage unit 508 are printed out from a plurality of the plotter units 506 (506-1 and 506-2).

The image data being compressed and recorded in the storage unit 508 are formed to be a packet and sent to the compression/depression process unit 507 through the packet switch network 501. The compression/decompression process unit 507 receives and decompresses the image data to reproduce original image data. After that, the image data are formed to be a packet and sent to the plotter image process unit 505-1 through the packet switch network 501 by the multicast (path 5701). Also, the image data are sent to the plotter image process unit 505-2 (path 5702).

Each of the plotter image process units 505-1 and 505-2 receives and processes data. After that, the data are transferred to the plotter units 506-1 and 506-2 through the packet switch network 501. The data are formed to be an image by each of the plotter units 506-1 and 506-2, respectively.

Figure 34:
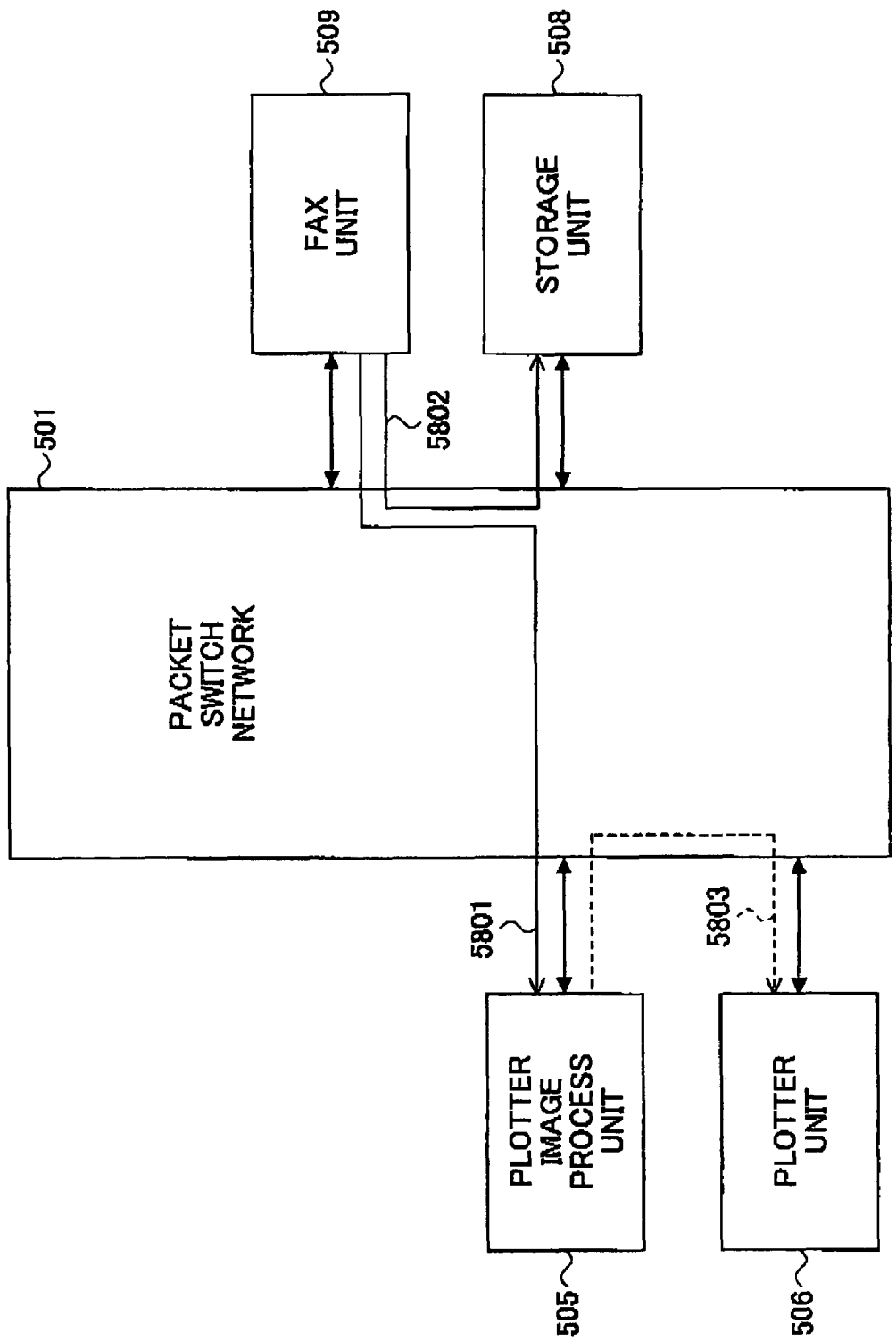
FIG. 34 is a block diagram showing a seventh multicast data transmission in the image forming apparatus according to the fifth embodiment of the present invention.

FIG. 34 is a block diagram showing a seventh multicast data transmission in the image forming apparatus according to the fifth embodiment of the present invention. In the seventh multicast data transmission, data received by the FAX unit 509 are output from the plotter unit 506 and simultaneously recorded in the storage unit 508.

Image data received by the FAX unit 509 are formed to be packet data and transmitted to the plotter image process unit 505 through the packet switch network 501 by multicast (path 5801), and are transmitted to the storage unit 508 by multicast (path 5802). The plotter image process unit 505 receives and processes data. After that, the data are formed to be a packet, sent to the plotter unit 506, and formed to be an image. Data sent to the storage unit 508 are recorded to a recording medium.

Figure 35:
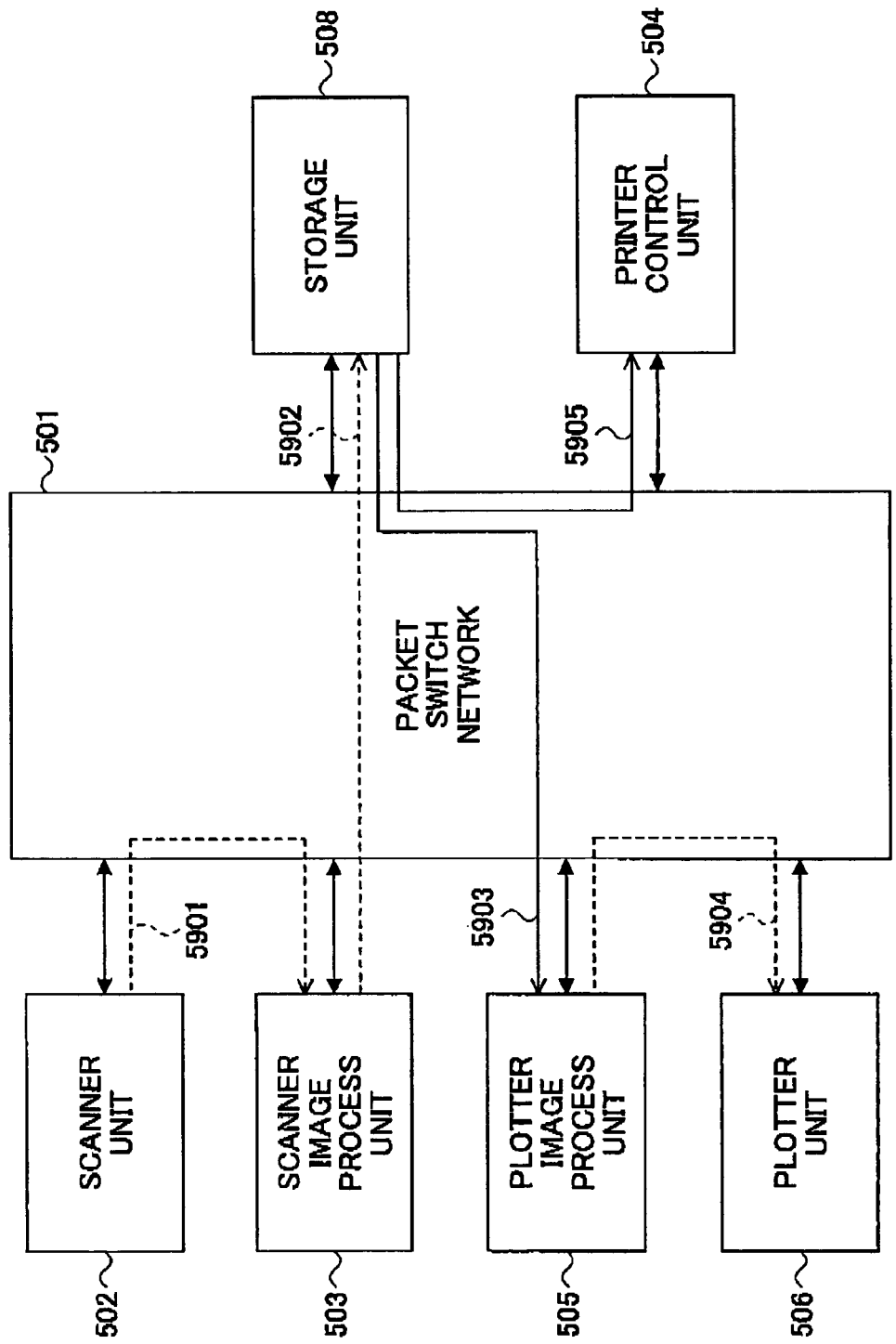
FIG. 35 is a block diagram showing an eighth multicast data transmission in the image forming apparatus according to the fifth embodiment of the present invention.

FIG. 35 is a block diagram showing an eighth multicast data transmission in the image forming apparatus according to the fifth embodiment of the present invention. In the eighth multicast data transmission, an image scanned by the scanner unit 502 are temporarily recorded in the storage unit 508. After that, data in that the image formation is conducted are output to an external terminal being connected to a network through the printer control unit 504.

Image data read by the scanner unit 502 are formed to be a packet and sent to the scanner image process unit 503 through the packet switch network 501 (path 5901). The scanner image process unit 503 receives and processes data. After that, the data are formed to be a packet and sent to the storage unit 508 through the packet switch network 501 to record (path 5902). In a case in that data recorded in the storage unit 508 is formed to be an image and output to a network simultaneously, data being recorded in the storage unit 508 are formed to be a packet, and transmitted to the plotter image process unit 505 and the printer control unit 504 through the packet switch network 501 by the multicast (path 5903 and path 5905).

The plotter image process unit 505 receives and processes data. After that, the data are sent to the plotter unit 506 through the packet switch network 501 (path 5904) and are formed to be an image. Data sent to the printer control unit 504 in order to output to the network are processed to be a packet for a network transmission and sent to an external terminal.

As described above, according to the fifth embodiment of the present invention, a large amount of image data can be transmitted at one time. It is possible to shorten the data transmission time.

Sixth Embodiment

Figure 36:
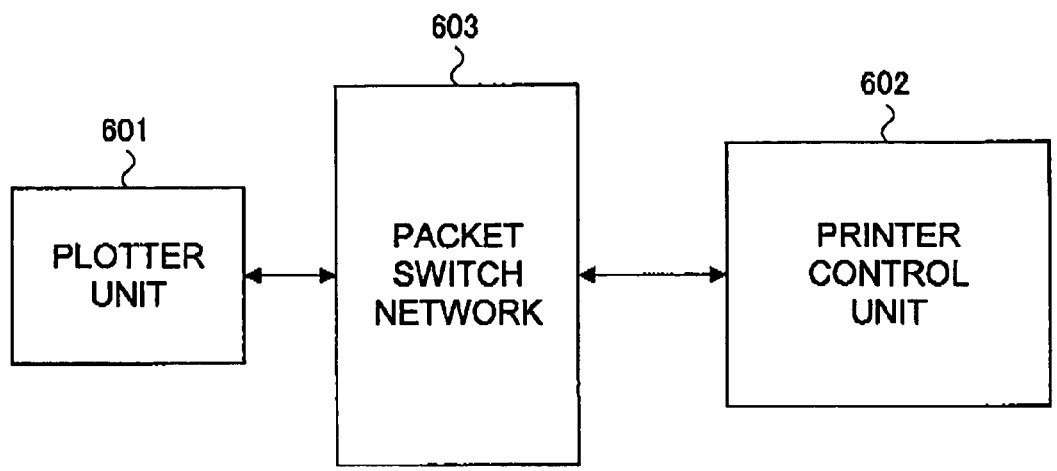
FIG. 36 is a block diagram showing an image forming apparatus according to a sixth embodiment of the present invention.

FIG. 36 is a block diagram showing an image forming apparatus according to a sixth embodiment of the present invention. A plotter unit 601 conducts various filtering processes and corrections to utilize the most process characteristics of a plotter. For example, the plotter unit 601 conducts a latent image formation by a LD (Laser Diode), and adhering toners to form an image. A printer control unit 602 converts data described in a printer language into image data and rotates an image. For example, a packet switch network 603 is configured as shown in FIG. 37.

Figure 38:
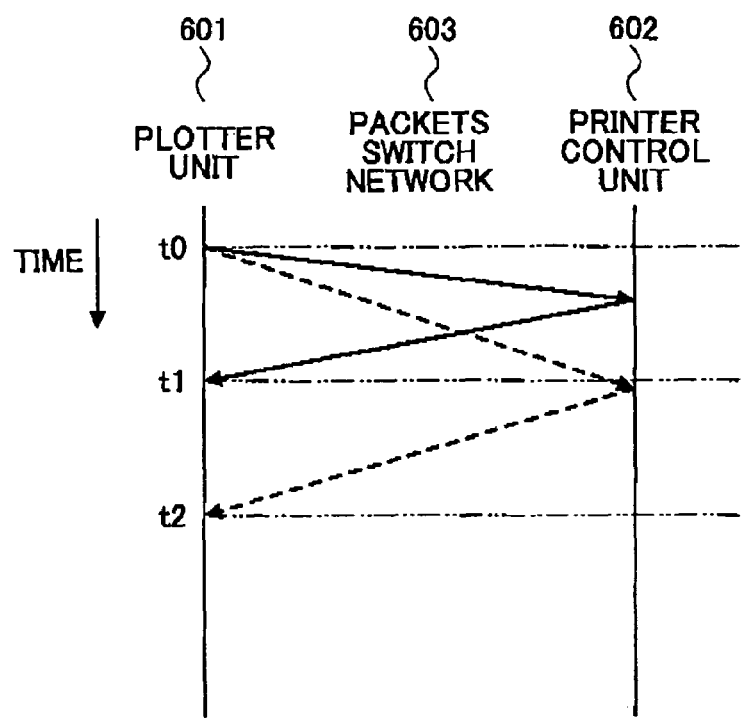
FIG. 38 is a diagram showing data transmission between the plotter unit and the printer control unit, according to the sixth embodiment of the present invention.
Figure 39:
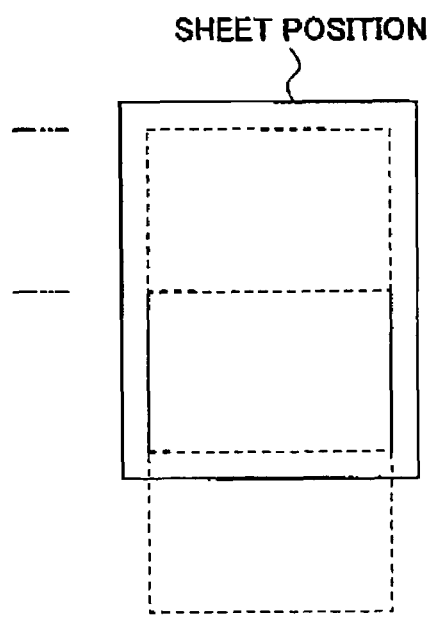
FIG. 39 is a diagram showing a relationship between image data position and a sheet position which correspond to a time, according to the sixth embodiment of the present invention.

FIG. 38 is a diagram showing data transmission between the plotter unit and the printer control unit, according to the sixth embodiment of the present invention. In FIG. 38, a time lapses downward. FIG. 39 is a diagram showing a relationship between image data position and a sheet position which correspond to a time, according to the sixth embodiment of the present invention.

Figure 37:
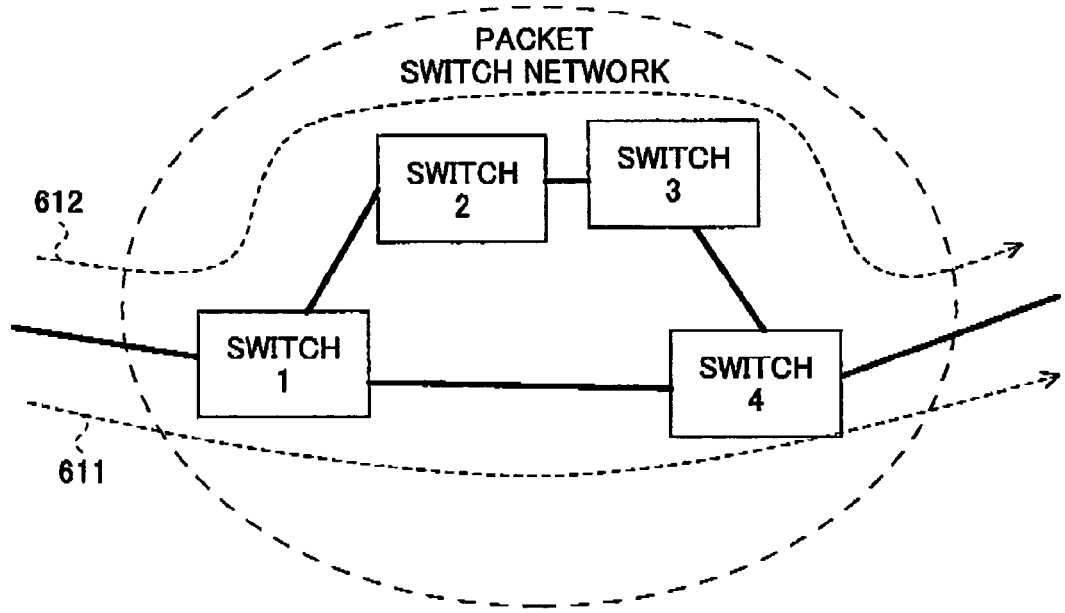
FIG. 37 is a diagram showing a configuration of a packet switch network according to the sixth embodiment of the present invention.

For example, an arrow returning at a time t1 in FIG. 38 shows a communication in a case in that a logical connection between the plotter unit 601 and the printer control unit 602 is established by selecting a physical connection of a path 611 in FIG. 37. An arrow returning at a time t2 in FIG. 39 shows a logical connection between the plotter unit 601 and the printer control unit 602.

As described above, a delay amount of data bus is different based on a configuration of the packet switch network 603. If a resist adjustment is conducted at the delay amount of a path 611 and an image forming operation is conducted by passing through a path 612, an image starts at the time t2 in FIG. 39. As a result, a delay occurs in a sub-scan direction with respect to the sheet position.

Figure 40:
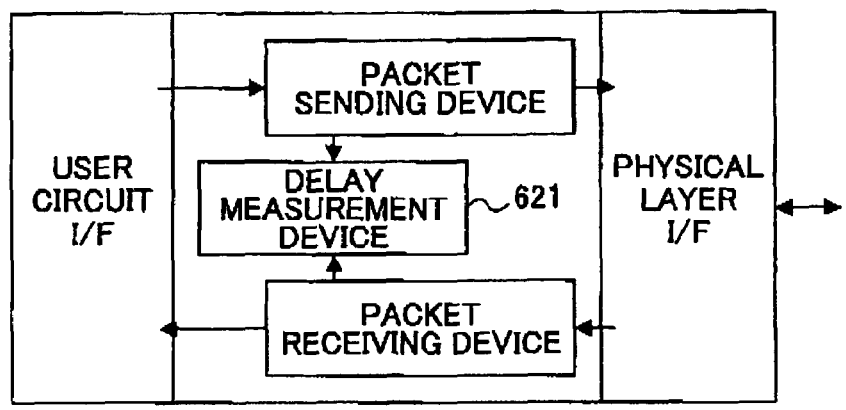
FIG. 40 is a block diagram showing a configuration including a delay measurement device according to the sixth embodiment of the present invention.
Figure 41:
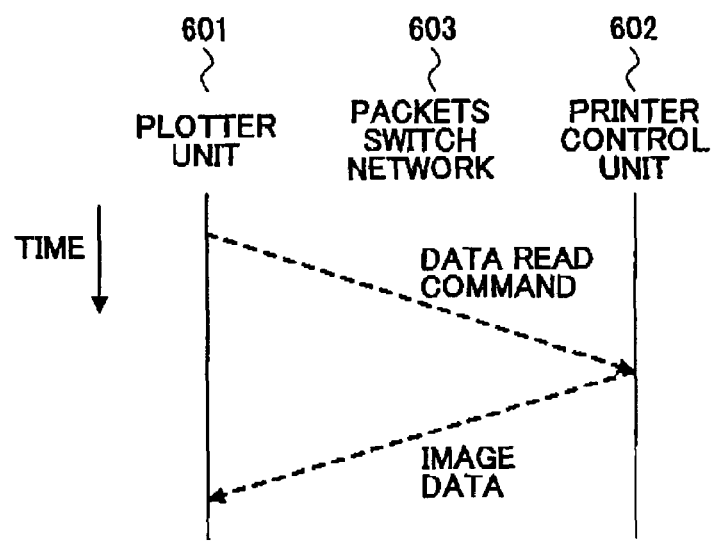
FIG. 41 is a diagram showing commands and data transmission between a plotter unit and a printer control unit, according to the sixth embodiment of the present invention.

Thus, a delay measurement device 621 shown in FIG. 40 is arranged to each port, so that a delay time from an issuance of a data read command shown in FIG. 41 to an arrival of first image data are measured and the delay time is reflected to a sub-scan image resist adjustment value of the plotter unit 601.

Figure 42:
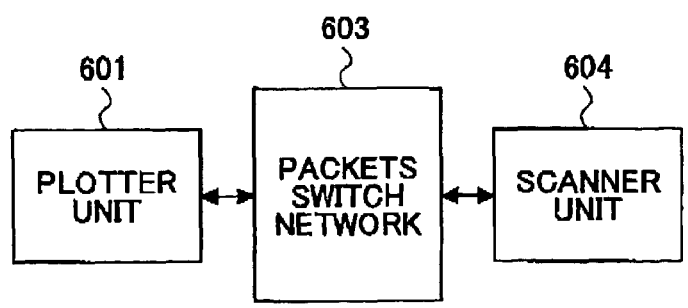
FIG. 42 is a block diagram showing a variation of the image forming apparatus according to the sixth embodiment of the present invention.

FIG. 42 is a block diagram showing a variation of the image forming apparatus according to the sixth embodiment of the present invention. For example, the scanner unit 604 reads image data by a CCD (Common Core of Data) and conducts a color conversion process and various filtering processes. The plotter unit 601 and the packet switch network 603 are the same as those in FIG. 36.

Figure 43:
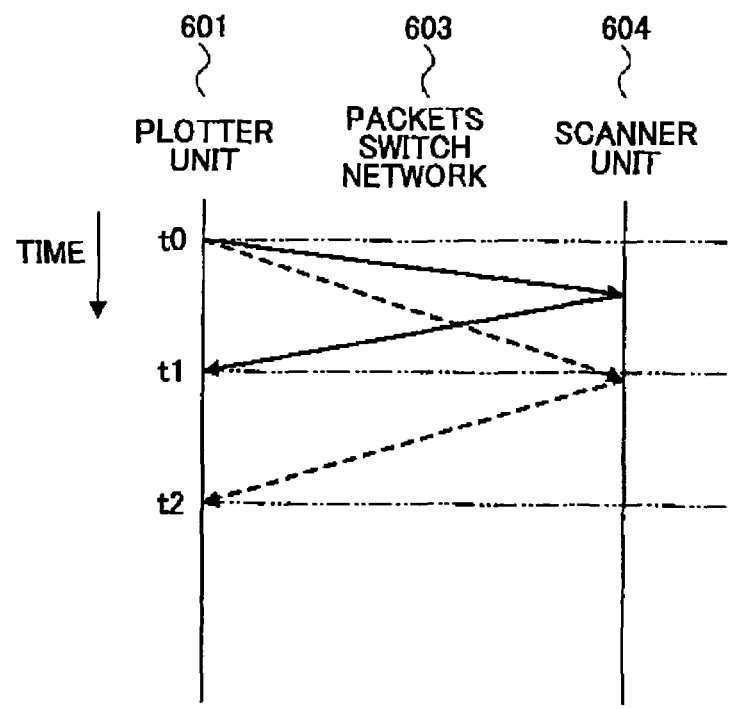
FIG. 43 is a diagram showing commands and data transmission between the plotter unit and the scanner unit, according to the sixth embodiment of the present invention.
Figure 44:
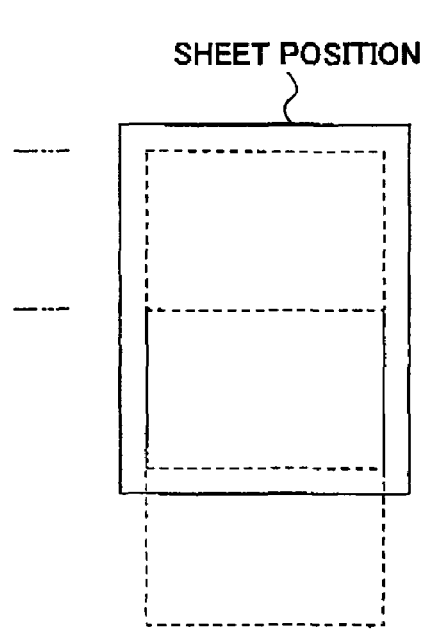
FIG. 44 is a diagram showing a relationship between the image data position and the sheet position which correspond to a time shown in FIG. 43.

FIG. 43 is a diagram showing commands and data transmission between the plotter unit and the scanner unit, according to the sixth embodiment of the present invention. In FIG. 43, a time lapses downward. FIG. 44 is a diagram showing a relationship between the image data position and the sheet position which correspond to a time shown in FIG. 43.

For example, an arrow returning at a time t1 in FIG. 43 shows a communication in a case in that a logic connection between the plotter unit 601 and the scanner unit 604 is established by selecting a physical connection of path 611 in FIG. 37. An arrow returning at a time t2 in FIG. 43 shows a case in that a logical connection between the plotter unit 601 and the scanner unit 604 is established by selecting the path 612 in FIG. 37.

As described above, the delay amount of data bus is different based on the configuration of the packet switch network 603. If the resist adjustment is conducted at the delay amount of the path 611 and the image forming operation is conducted by passing through the path 612, an image starts at the time t2 in FIG. 44. As a result, a delay occurs in a sub-scan direction with respect to the sheet position.

Thus, a delay measurement device 621 shown in FIG. 40 is arranged to each port shown in FIG. 36, so that a delay time from the issuance of a data read command shown in FIG. 41 to the arrival of first image data are measured and the delay time is reflected to a sub-scan image resist adjustment value of the plotter unit 601.

Figure 45:
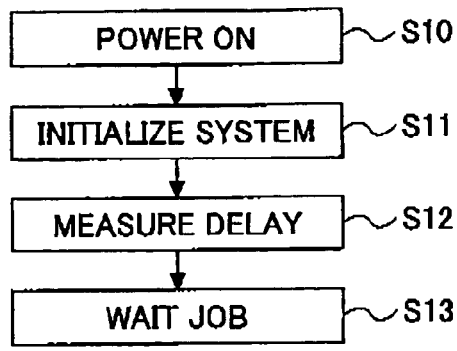
FIG. 45 is a flowchart for explaining a control when power is on, according to the sixth embodiment of the present invention.

FIG. 45 is a flowchart for explaining a control when power is on, according to the sixth embodiment of the present invention. When the power is on (step S10), a system is initialized (step S11). A delay measurement is conducted in accordance with a sequence as shown in FIG. 41 (step S12), and a value measured in step S12 is used at each job. The system waits a job (step S13).

Figure 46:
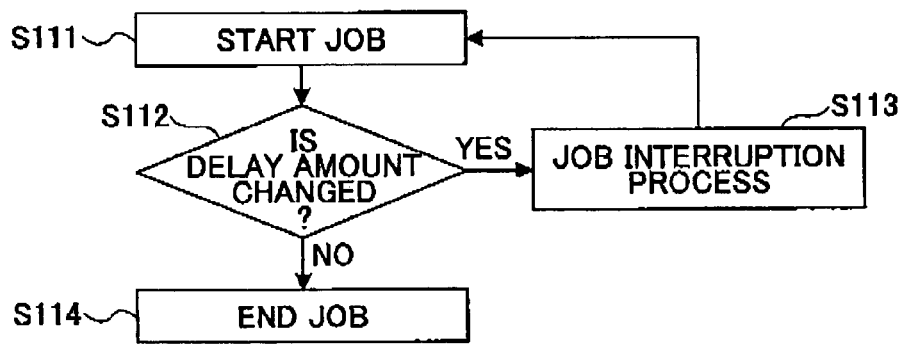
FIG. 46 is a flowchart for explaining a control at a job start, according to the sixth embodiment of the present invention.

FIG. 46 is a flowchart for explaining a control at a job start, according to the sixth embodiment of the present invention. When each job starts (step S111), a previous resist setting value is maintained and the delay amount is measured. When the delay amount is changed (Y in step S112), a job is interrupted (step S113). Then, the resist setting value is set again based on a measured value.

Figure 47:
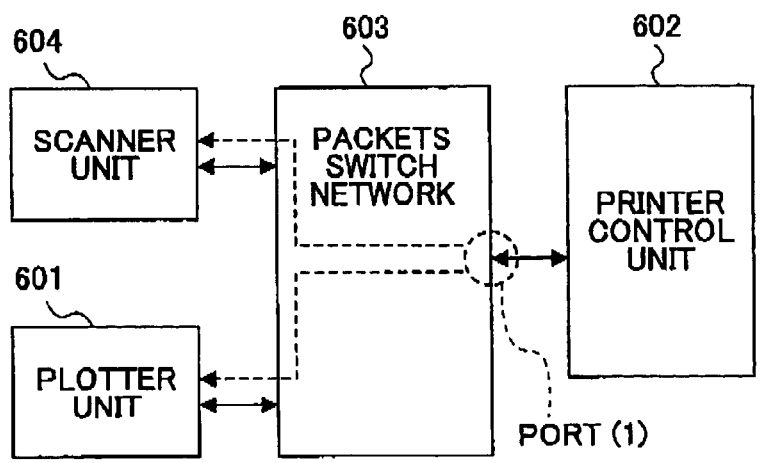
FIG. 47 is a diagram showing an operation in the image forming apparatus according to the sixth embodiment of the present invention.

FIG. 47 is a diagram showing an operation in the image forming apparatus according to the sixth embodiment of the present invention. For example, it is assumed that the printer control unit 602 is newly connected to a port (1). A connection detecting mechanism is arranged to the port (1) of the packet switch network 603. By detecting a connection, a packet switch issues a control packet showing a connection detection to each port. The plotter unit 601, which is a unit having a data delay in units which receives this control packet, conducts a delay measurement in accordance with the sequence shown in FIG. 41.

In the sixth embodiment of the present invention, for example, the delay measurement is conducted in accordance with the sequence shown in FIG. 45 when the power is on. In this case, paths to be selected within the packet switch 603 are all paths such as the paths 611 and 612 (FIG. 37). A measurement result is recorded in the system (the image forming apparatus). The plotter unit 601 obtains path information being currently selected while sending and receiving commands before a job starts, and uses the path information as the resist setting value. In this case, the packet switch network 603 is controlled so that the paths used for the same job are not changed.

According to the sixth embodiment of the present invention, first, instead of sacrificing a scalability of the system, it is possible to always obtain a normal image in that an image print position is not displaced with respect to image data.

Second, instead of sacrificing a scalability of the system, it is possible to always obtain the normal image in that the image print position is not displaced with respect to the image data sent form the scanner unit.

Third, it is possible to detect a change of a system configuration by a simple control.

Fourth, it is possible to detect the change of the system configuration being used by the simple control.

Fifth, it is possible to surely detect the change of the system configuration being used by the simple control.

Sixth, even if paths for the data packet transmission are changed, it is not required to measure the delay amount each time. The above advantages can be obtained by the simple control and at high speed.

The present invention is not limited to the specifically disclosed embodiments, and variations and modifications may be made without departing from the scope of the present invention.

What is claimed is:

1. An image forming apparatus comprising:
   an input module, an output module, a process module, and a memory;
   a packet switch having a plurality of ports and independent paths for data transmission, the packet switch being connected to the input, output and process modules, and to the memory; and
   a path controlling part determining a process path based on data information from the input module and data transmission ability of paths within the image forming apparatus, and conducting a selection control to select a data transmission path in response to information stored in the memory, wherein the information includes data transmission delay time for each process path and a data type of data to be transmitted.

2. The image forming apparatus as claimed in claim 1, wherein information concerning the data transmission ability for each data type required between the input module and the output module is stored in the memory.

3. The image forming apparatus as claimed in claim 2, further comprising a delay measurement device, and wherein a value measured by said delay measurement device when power is on is stored in the memory as the information concerning the data transmission delay time.

4. The image forming apparatus as claimed in claim 2, wherein the information concerning the data transmission ability required between the input module and the output module at a minimum to store in the memory is updated each time a configuration of the image forming apparatus is changed.

5. The image forming apparatus as claimed in claim 1, wherein the memory stores path information, the information concerning the data transmission ability, and the information concerning the delay time when a path change is conducted.

6. The image forming apparatus of claim 3, further comprising a plotter unit, and wherein a sub-scan operation of said plotter unit is adjusted based on the delay time information stored in said memory.

7. The image forming apparatus of claim 1, wherein the data information used by the path controlling part are process state and used capacity of process module and memory.

8. The image forming apparatus of claim 1, wherein the packet switch is one of a plurality of packet switches of a packet switch network, each of the plurality of packet switches further comprising a plurality of selectors, and a plurality of switches.

* * * * *